Dec. 20, 1927.

M. O. SCHUR 1,653,125

METHOD OF AND MECHANISM FOR TESTING PULP SUSPENSIONS

Filed June 20, 1924   8 Sheets-Sheet 1

Inventor:
Milton O. Schur

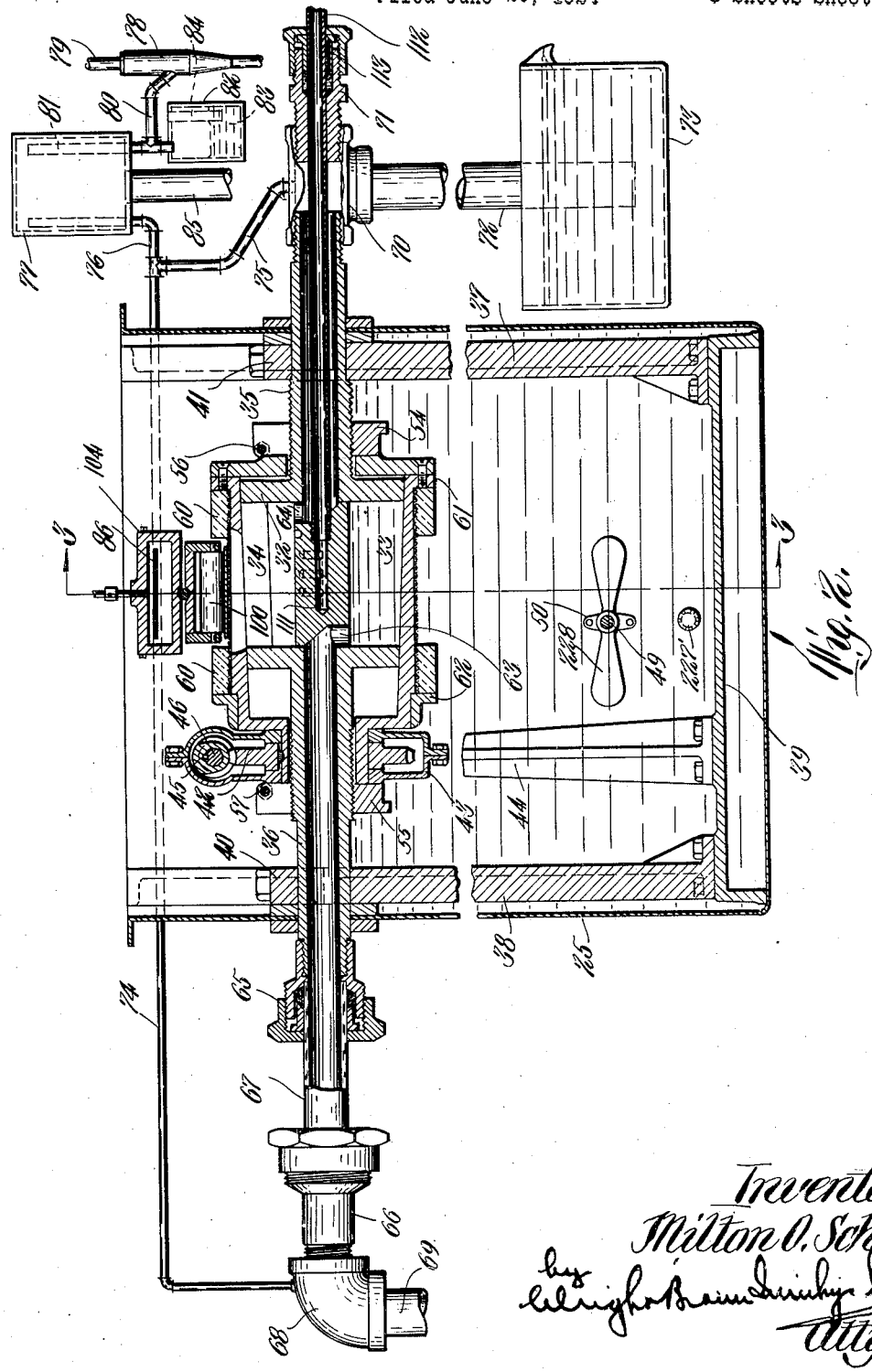

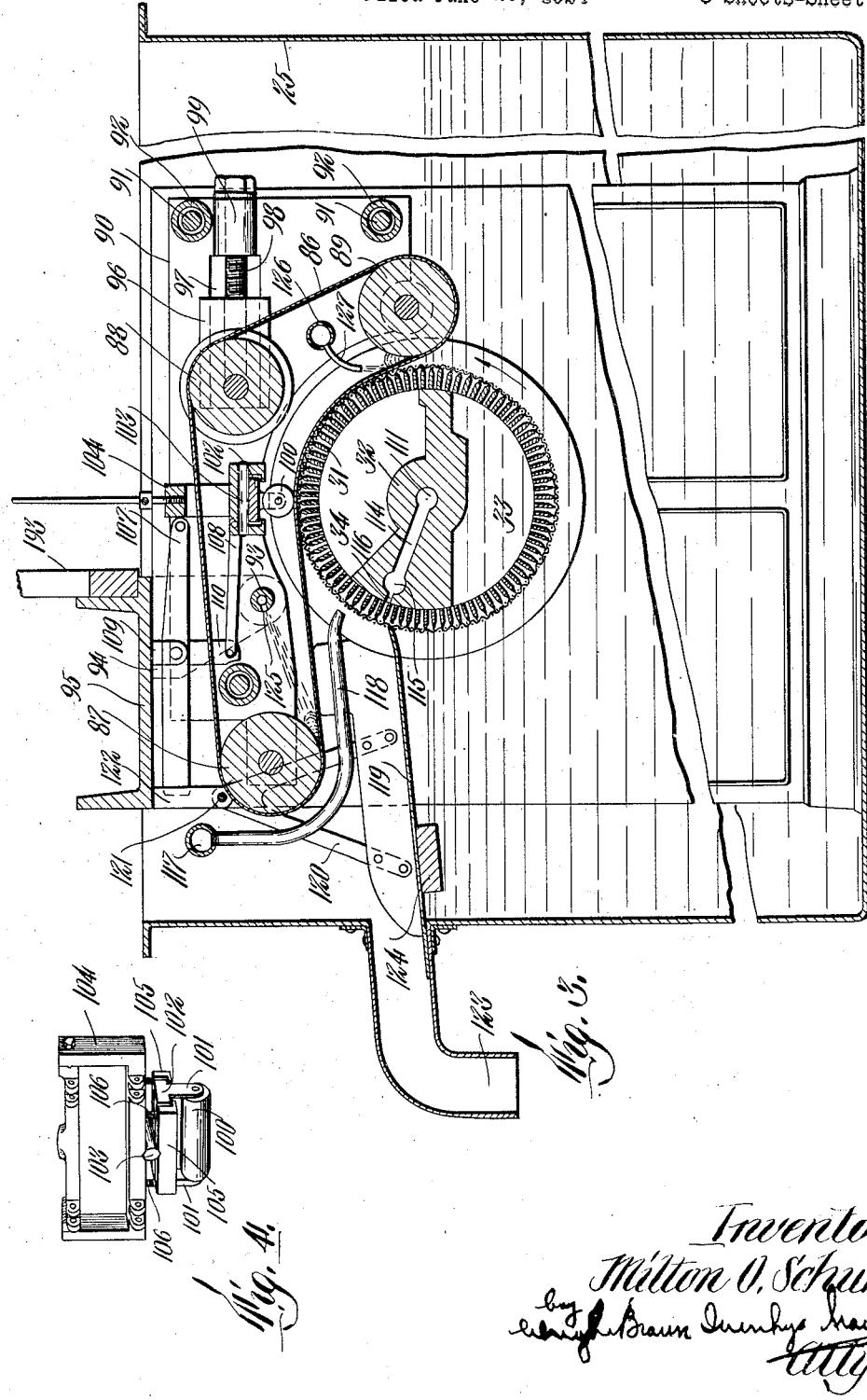

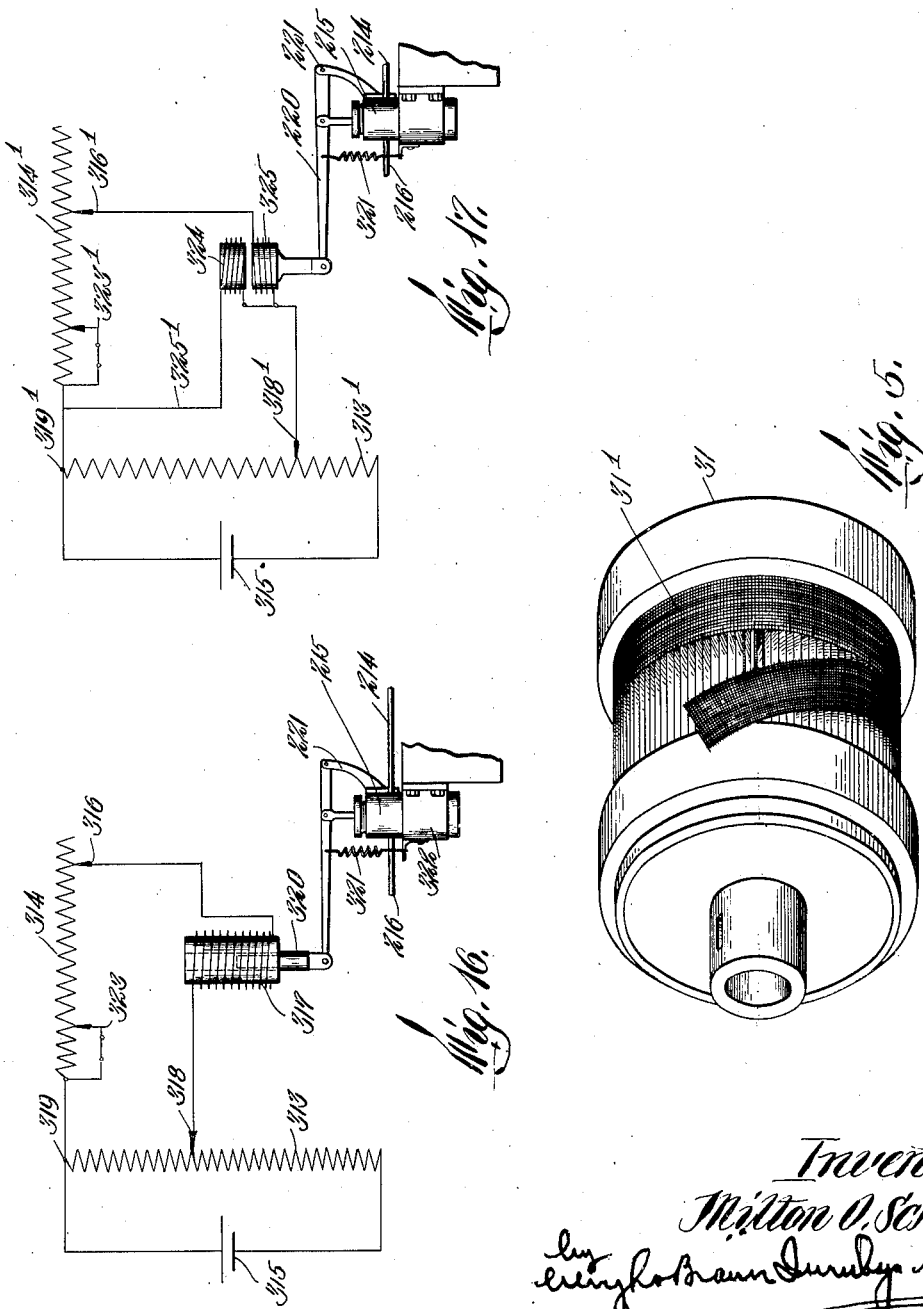

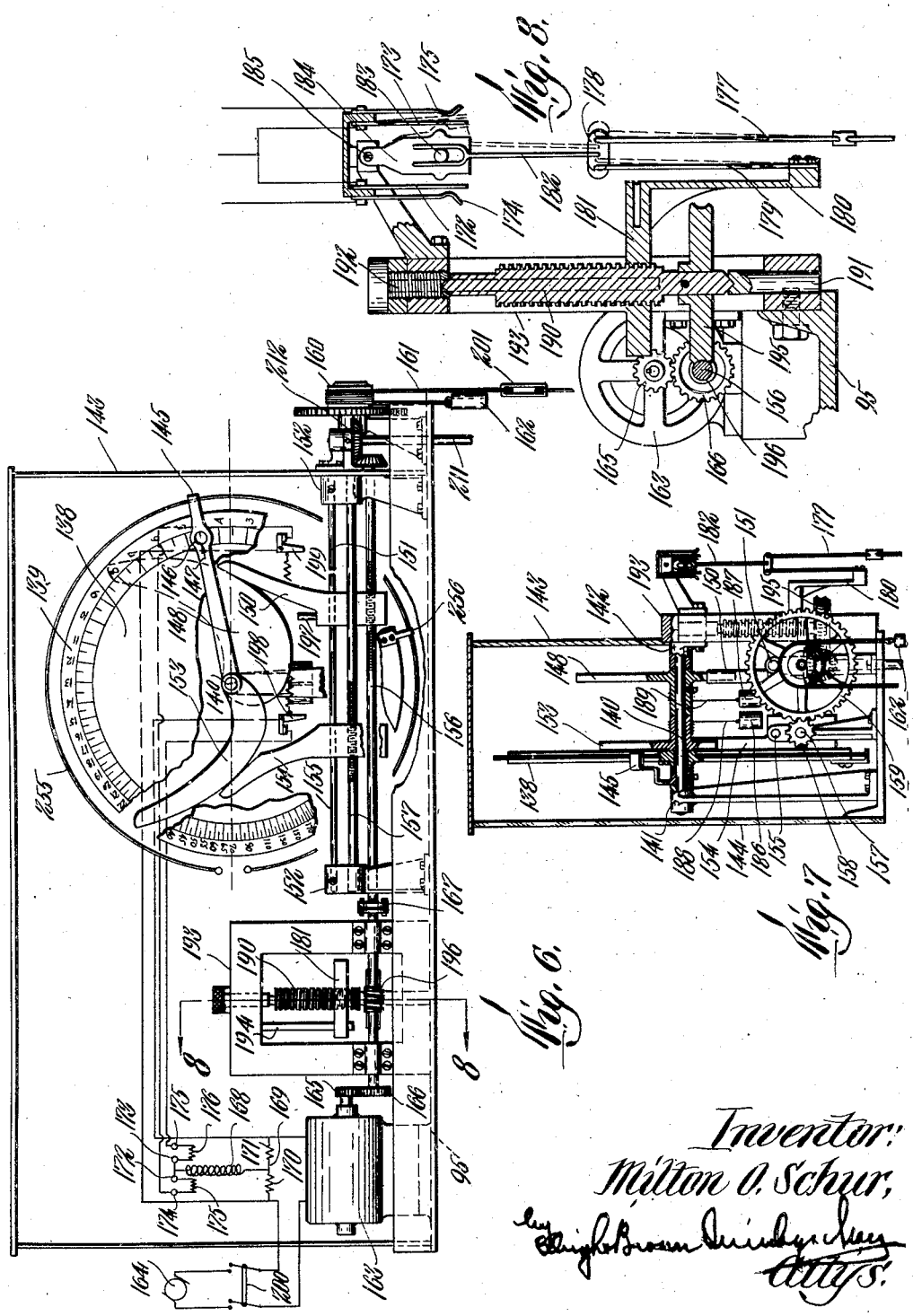

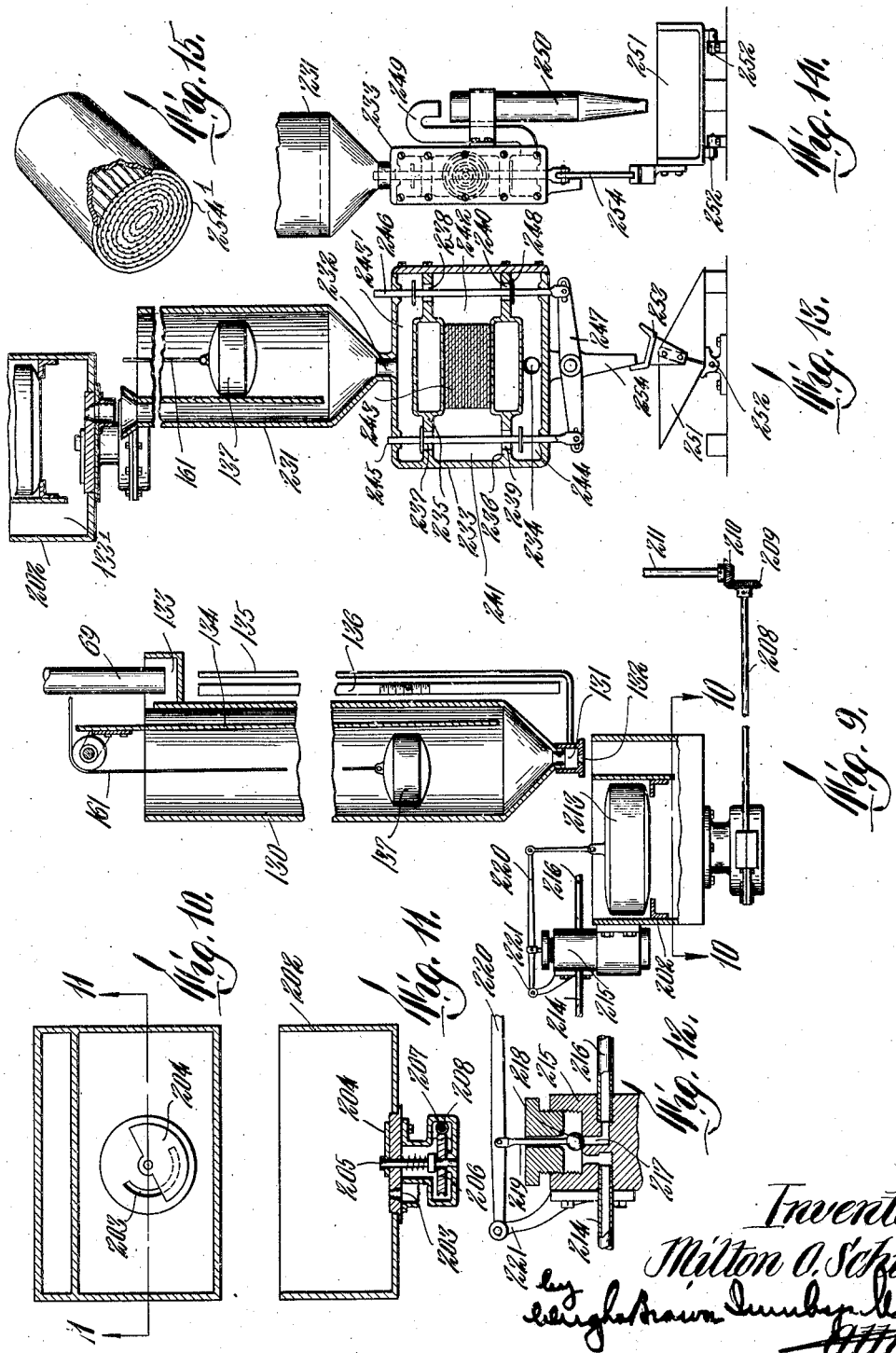

Dec. 20, 1927.　　　　　　　　　　　　　　　　　　　1,653,125
M. O. SCHUR
METHOD OF AND MECHANISM FOR TESTING PULP SUSPENSIONS
Filed June 20, 1924　　　　8 Sheets-Sheet 7
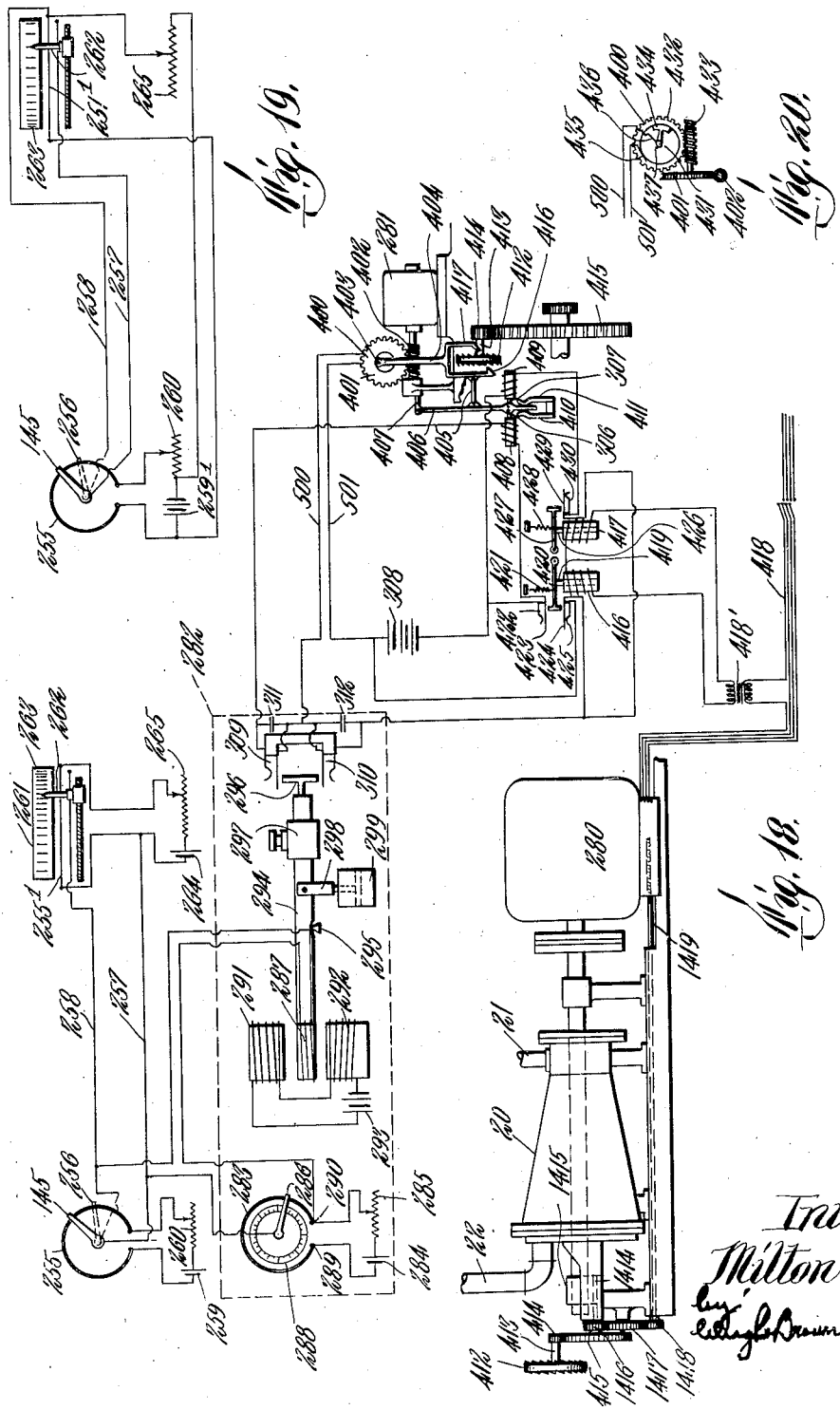
Inventor:
Milton O. Schur

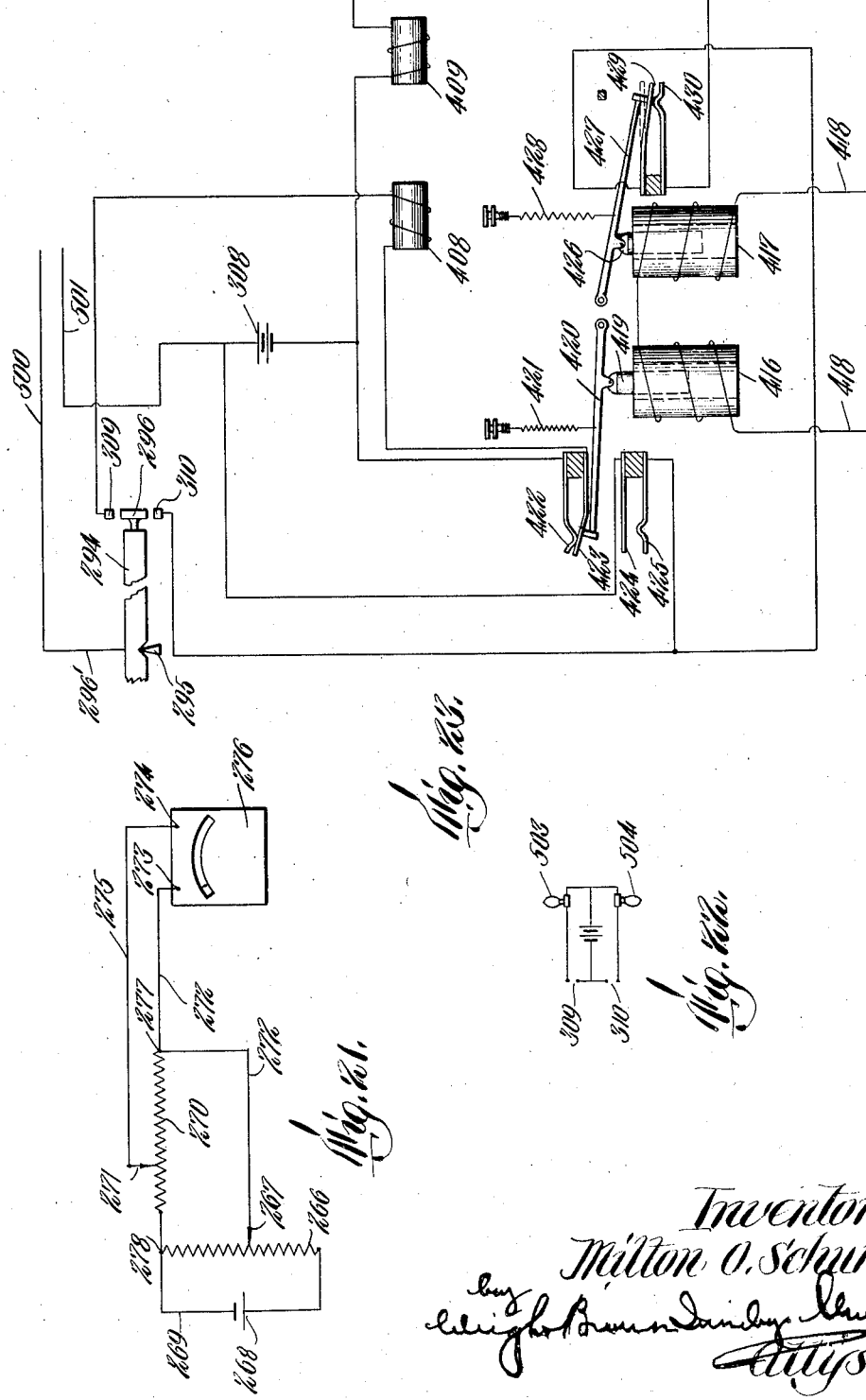

Patented Dec. 20, 1927.

1,653,125

UNITED STATES PATENT OFFICE.

MILTON O. SCHUR, OF BERLIN, NEW HAMPSHIRE, ASSIGNOR TO BROWN COMPANY, OF BERLIN, NEW HAMPSHIRE, A CORPORATION OF MAINE.

METHOD OF AND MECHANISM FOR TESTING PULP SUSPENSIONS.

Application filed June 20, 1924. Serial No. 721,246.

This invention has relation to means for automatically controlling the concentration of liquid suspensions, for indicating the characteristics of the material in suspension, and for controlling the character of such material. While the inventions and improvements hereinafter described are applicable for use in various arts, I shall describe them more particularly in connection with cellulosic materials, but I desire to have it understood at the outset that the inventions and improvements are not limited thereto.

It is well known that the characteristics of cellulosic materials, such as wood pulp or pulp produced from other sources of cellulose, vary according to the sources from which they are derived, and according to the processes to which they are subjected in the course of fiber liberation as well as in the operation known as "beating". Any given cellulosic fibers, when subjected to a beating operation, have their characteristics changed in certain ways, the pulp gradually varying from "free" to "slow" as beating progresses. Ordinarily during the beating operation as the slowness increases, the fibers behave as though they were coated with an increasing amount of mucilaginous matter. The characteristics of the paper or other sheet produced from any given cellulose material vary with the slowness or freeness of the stock: for example, whereas a sheet of paper made of unbeaten fibers is apt to be soft, highly porous, of coarse non-uniform texture, and weak, as the pulp is beaten the paper made therefrom becomes progressively harder, denser, of more even formation, and, up to a certain point, stronger.

The term "slowness" as applied to cellulose fiber may be defined as the resistance of a wet mat or web of pulp to the passage of water through it. This resistance is of importance in paper making for two major reasons: first, because it determines to a large extent the rate at which fibers are deposited on the Fourdrinier wire or on the cylinder-mold of the paper machine; and second, because it serves as an indication of the extent to which the fibers have been beaten. The slowness of a given pulp, therefore, is related intimately to the rate of paper-production and to the quality of the finished product.

Heretofore endeavors have been made to ascertain the slowness of pulp, but such attempts have resulted only in apparatus suitable for intermittent laboratory tests or in devices which yield but rough indications of the quality of slowness. So far as I am aware, no one has heretofore produced any method or means by which the slowness of pulp could be conveniently and accurately ascertained and recorded especially in the mill. Usually the extent of determination of the slowness of the pulp by a mill test has depended upon the personal equation of the operator, who by reason of long experience is able to gage to some extent the slowness of the stock by "feel"; but it is evident that this method of determining the condition of the stock is unsatisfactory where it is desired to produce an unvarying product, for, among other factors, the temperature of the stock suspension and the fiber concentration may influence the judgment. It is, of course, of the greatest importance in the operation of the paper mill that the condition of the stock, as a result of the beating operation, should be uniform. If the stock is too slow, power has been wasted in beating, and the desired ream-weight of paper can be maintained only by reducing the speed of the web-forming machine, and hence by cutting down production, or by heating the fiber suspension either in the vat of a cylinder machine or as it flows on to the wire of a Fourdrinier machine, thereby entailing a waste of steam, or else by increasing the concentration of fiber in the vat or in the head-box, with the attendant risk of forming a "wild" sheet. If, on the other hand, the stock is too free, the sheet made therefrom may be wild and low in strength.

One feature of the present invention consists of means for determining accurately and automatically, and for recording, if desired, the degree of slowness of a beaten stock, so that, if a determination indicates that it has been insufficiently beaten, the beating conditions may be adjusted until a further indication shows that the stock has been beaten to the desired degree.

The invention further comprises, however, means by which the beating of the stock may be automatically controlled according to the desired predetermined degree of slowness of the beaten stock, as a result of which I am able to produce, without involving the personal equation, a given degree of slowness in any particular stock, as will be subsequently explained.

There are several variable factors to be considered in determining the degree of slowness of the stock, namely: first, the stock concentration or proportion of cellulosic material to the water in the aqueous suspension; second, the temperature of the aqueous component of the stock; third, the hydraulic head of the suspension in measuring or ascertaining the slowness; and, fourth, the thickness of the pulp mat through which the aqueous component of the suspension is being filtered. To secure an accurate determination of the degree of slowness of a given suspension, the stock concentration should be known or else means should be provided for ensuring an unvarying proportion of cellulosic material to the water, or compensation should be made for the varying proportions of these two components. Again, since the viscosity of water varies sharply with temperature fluctuations, a slowness determination is comprehensive only if the water be at a given temperature or if compensation be made for variations in temperature. The hydraulic head affects the test not only because it is the force tending to cause the aqueous component to flow through the pulp mat, but also because it influences the compactness of the mat or web of fibers. It is, consequently, important for a comprehensive indication of slowness that the hydraulic head should be substantially unvarying, or that compensation should be made for variations therein. Further, since the resistance to the passage of water through a pulp mat depends upon the thickness of the mat, it is evident that both the rate of flow of water through the mat and the thickness enter into a comprehensive determination of slowness. All of these variable factors have been taken into account in the method and means which may be practiced or which may be embodied in the processes and devices which I have hereinafter illustrated and described as embodying my inventions and improvements.

I have provided mechanisms automatically for determining (and recording, if desired) the slowness of stock, which may be so arranged as to receive substantially continuously from the beating engine through a suitable by-pass a portion of the beaten stock. This apparatus comprises generally a vat and a travelling screen, such as a cylinder mold, operating therein, which are comparable in some respects with the vat and cylinder mold used for the formation of a fibrous web. A mathematical analysis of the process whereby a pulp mat is picked up on a cylinder mold, together with an experimental investigation have shown that within limits, if the rate or flow of white water (i. e. water passing through the pulp mat) is multiplied by the thickness of the pulp mat, when the latter has been subjected to a standardized pressure, the product is substantially constant for pulp of a given quality and may be considered to be a direct measure of slowness or freeness, if the rate of rotation of the cylinder mold, the hydraulic head and the temperature are kept substantially constant, and if the stock concentration is substantially unvarying or changes but slowly. Or, if the stock concentration and the hydraulic head of the aqueous pulp suspension are constant, and the temperature of the suspension is kept constant or is compensated for, the slowness of the stock may be ascertained by measuring either the thickness of the pulp mat or the rate of flow of the white water.

In the apparatus which I have illustrated as embodying my invention, the rate of flow of the white water and the thickness of the pulp mat or web on the cylinder are both measured; and by means of an indicating or recording instrument, these two factors are multiplied, one by the other, to give a reading which is indication of the freeness and hence of the slowness of the stock suspension in the vat. It may be here pointed out that since slowness is the reciprocal of freeness, any indication of the one is an indication of the other and that in the specification and claims either may be used to express the characteristics of pulp suspension or of other solid suspensions, it being distinctly understood, however, that the thickness of the mat picked up by the Fourdrinier wire, the rate of flow of water through the mat, or the product of the thickness by the rate of flow are proportional directly to freeness and inversely to slowness. Also provision is made by which the operation of the beating engine is automatically controlled by the devices which measure the rate of flow of the white water and thickness of the pulp mat on the cylinder mold, so as to maintain such operation of the beating engine as to ensure a predetermined slowness of the stock. Means are also preferably provided by which a predetermined consistency of the aqueous suspension in the vat is substantially maintained by varying the supply of cellulosic material, so that, if the consistency of the stock tends to become too thin, an increased amount of cellulosic material is added thereto, or if the concentration tends to become too thick the supply of cellulosic material is decreased. Consequently, although the stock as delivered from the beating engine may vary in consistency, nevertheless the consistency of the cellulosic suspension in the vat may be maintained substantially constant. Variations in the temperature of the stock due to external thermal conditions are either compensated for, or the aqueous stock in the vat may be maintained at a given temperature. Means are preferably provided for maintaining a constant hydraulic head of the aqueous pulp suspension in the vat in measuring the rate of flow of the white water through the mat or web of the fibers on the cylinder mold.

Referring to the accompanying drawings,—

Figure 2 represents a section on the line 2—2 of Figure 1.

Figure 3 represents a section on the line 3—3 of Figure 2.

Figure 4 is a perspective view illustrating the frame and the roller thereon which bears against the apron forming a part of the slowness tester.

Figure 5 (Sheet 4) illustrates a method of making the cylinder mold by winding the wire or screen helically on a suitable frame.

Figure 6 illustrates the indicating portion of the testing apparatus by which there is indicated the slowness of the stock.

Figure 7 represents an end view of the same, certain portions being shown in section.

Figure 8 represents an enlarged section on the line 8—8 of Figure 6 and illustrates means for controlling the circuit of the motor which forms a part of the indicating mechanism.

Figure 9 shows in section means for measuring the flow of white water from the cylinder mold of the tester and also for controlling the consistency of the stock suspension in the vat.

Figure 10 represents an enlarged section on the line 10—10 of Figure 9.

Figure 11 illustrates a section on the line 11—11 of Figure 10.

Figure 12 represents in section the float-controlled valve through the agency of which the stock suspension in the vat may be maintained substantially constant.

Figure 13 represents in section another form of device for measuring the rate of flow of white water from the cylinder mold of the vat.

Figure 14 represents a side elevation of the same.

Figure 15 represents a conduit consisting of a cluster of capillaries in the measuring device of Figure 13.

Figures 16 and 17 represent diagrammatically alternative electric means for maintaining a given consistency of stock in the vate of the testing apparatus.

Figure 18 illustrates conventionally and diagrammatically means which may be utilized in controlling the operation of the beating engine by means of the slowness tester, so as to maintain a predetermined slowness of the beaten stock.

Figure 19 shows a different arrangement of certain of the circuits in the recording mechanism.

Figure 20 represents a detail in the apparatus conventionally shown in Figure 18.

Figure 21 illustrates an alternative means of indicating the freeness of the stock.

Figure 22 illustrates another means for indicating to an engineer the adjustment to make in the beater to change the slowness of the stock.

Figure 23 illustrates on a larger scale certain of the electrical instruments illustrated in Figure 18, but shows a slightly different circuit arrangement.

Figure 1:
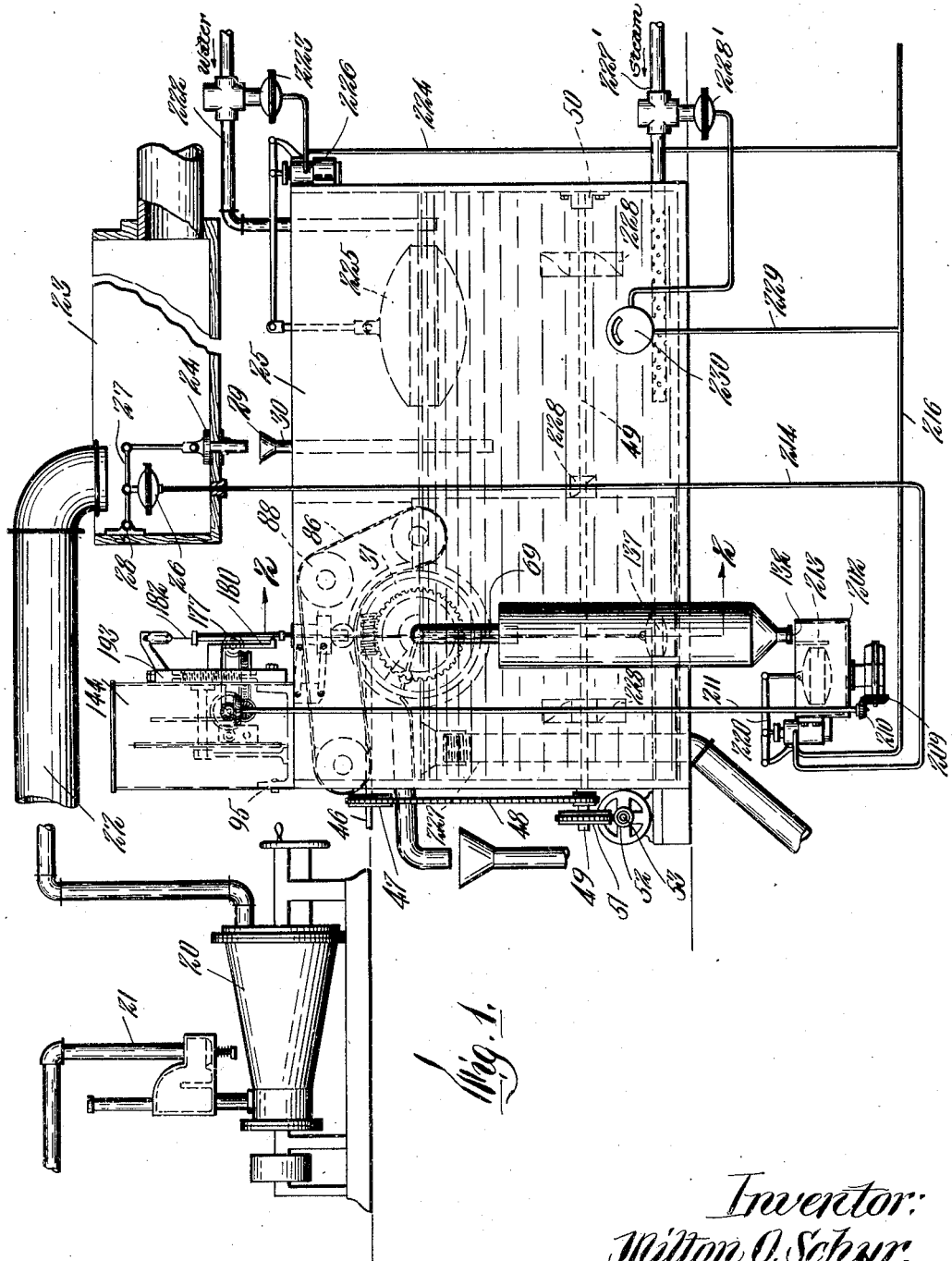
Figure 1 represents a slowness tester embodying the present invention. In this figure the beating engine is shown more or less conventionally on a very small scale as compared with the scale of the testing apparatus.

Referring to the drawings which have been thus briefly described and more particularly to Figures 1 to 3 inclusive, I have illustrated conventionally at 20 a beating engine of the Jordan type to which the stock is delivered by a conduit 21 and from which the beaten stock is delivered from a conduit 22 to the chest of the paper machine. These parts are shown on a very small scale. In accordance with my invention, I propose to draw substantially continuously from the conduit 22 a supply of beaten stock by means of a by-pass, so that the slowness of this stock may be constantly measured and indicated either visually or by a recording apparatus or both. While I prefer that the beaten stock be constantly withdrawn from the delivery conduit of the beating engine, obviously the stock may be withdrawn intermittently under certain conditions of the operation. As illustrated, however, there is interposed in the delivery conduit 22 a box 23 having a valve 24 controlling the port through which the stock may be emitted to the vat 25 of the apparatus which I have illustrated for ascertaining or determining slowness. This valve 24 is automatically controlled by means subsequently to be described. I have illustrated the valve as being operated by the diaphragm of a diaphragm motor 26 through a lever 27 pivoted at 28. The stock delivered past the valve may be received by a funnel 29 and delivered through a standpipe 30 into the vat 25. Within the vat 25 I arrange a travelling screen such as a cylinder mold indicated as a whole at 31. This cylinder mold preferably consists of a bronze shell rotating on a stationary tapered bronze plug 32. The shell is provided with a large number of equally spaced radially disposed longitudinal slots which widen or diverge outwardly to form knife edges at the periphery of the roll about which a screen or strip of Fourdrinier wire 31' is tightly wound. Preferably the screen or wire is formed in a narrow strip which is wound helically about the periphery of the roll with the edges of the convolutions abutted together so as to present no protuberances on the periphery of the mold. The shell of the cylinder mold and the plug have a ground and lapped fit so as to form an air-tight and water-tight joint between them. The plug is recessed between its ends to form the chambers 33 and 34, as shown in Figure 3, between it and the shell of the cylinder mold. The ends of the plug are provided with reduced hollow hubs 35, 36, which are secured against rotation in the uprights 37, 38 of a frame located in the vat 25, said frame being provided with a base 39 as best shown in Figure 2. The plug is held against rotation by cap clamps 40, 41. The cylinder mold is rotated at a constant rate of speed by any suitable mechanism driven from a suitable source of power. For example, there may be secured to one end of the cylinder mold a worm wheel 42 arranged within a housing 43 secured to brackets 44 rising from the base 39 of the frame. The end of the cylinder mold is formed with a hub to which the worm wheel 42 is secured, as best shown in Figure 2. A worm 45 engages the worm wheel to impart rotation thereto, said worm being located within the housing 43 and being mounted on a shaft 46 which extends through the housing and through the end of the vat, as shown in Figure 1. This shaft may be driven in any suitable manner, but as illustrated it is provided with a sprocket wheel 47 driven by a sprocket chain 48 from a shaft 49 which extends through a stuffing box into the vat and at its other end is mounted in a journal 50 as indicated in dotted lines in Figure 1. On its outer end, the shaft 49 is provided with a worm wheel 51 which is engaged and driven by a worm 52 on a shaft 53 of a constant speed motor of any suitable kind.

Provision is made for adjusting the plug axially relative to the cylinder mold, to compensate for wear and to maintain a water-tight joint between them. To this end, there are placed upon the threaded portions of the hubs 35, 36, the plug clamp nuts 54, 55, which bear against the ends of the cylinder mold. By rotating these nuts in one direction or the other, the plug may be adjusted lengthwise of the cylinder mold. Each clamp nut is split and its split sections may be drawn together by bolts 56, 57, thereby tightly clamping the nuts on the hubs 35, 36.

Placed upon the cylinder mold and overlapping that part of the screen or wire which is soldered to the non-slotted end portions of the shell are the two rubber deckles indicated at 60, 60. One of the deckles abuts against a peripheral flange 61 on the shell, and after the other deckle is properly located, it abuts against a removable ring 62 which is placed on and secured to the end of the shell opposite that on which the flange 61 is formed. By removing the ring or collar 62, the deckles may be removed and replaced if desired. The two hubs 35, 36 of the plug are hollow, the interior of the hub 36 communicating with the chamber 33 by the port 63, and the hollow interior of the hub 35 communicating with the chamber 34 by the port 64. The level of the stock suspension in the vat 25 is kept at the axis of the cylinder mold and the plug 32, and the plug is so arranged that the chamber 34 thereof is located above the level of the stock suspension, and the chamber 33 is located below it. Suction is maintained in both of these chambers as the cylinder mold is being rotated so that the water component of the stock suspension, which passes through the pulp mat formed and being formed on the wire or screen 31' and through the slots in the shell of the cylinder mold, flows outwardly through the hub or sleeve 36. It is desirable for several reasons that a minus pressure should be maintained in the chamber 34 of the plug within the cylinder mold;—first, to prevent any possibility of the leakage of air from this chamber past the joint between the shell of the cylinder mold and the plug into the chamber 33; second, to hold the mat or web of pulp upon the wire or screen as the latter rises above the level of the suspension in the vat; and, third, to prevent the mat from being picked up and removed by an apron which will subsequently be explained and which engages the mat during a portion of its travel on the wire or screen. It may be here pointed out that the suction in the chamber 34 balances the suction in the chamber 33, means being provided for ensuring the maintenance of this balance.

The hub 36 is connected by a gland and stuffing box, indicated as a whole at 65, with a sectional conduit 66, the section 67 of said conduit being formed of glass so as to permit an observation of the flow of water through the conduit. The conduit is provided with an elbow 68 and with a vertical leg 69 which delivers the water to a meter by which the rate of flow of the water is determined. The other hub 35 of the plug is provided with a T fitting 70 into which is screwed a closure or plug 71. The fitting 70 is provided with a depending leg 72 which is slightly longer than the leg 69 and which extends below the level of water in a cup or receptacle 73.

Any suitable means may be employed for creating and maintaining a suction in the two chambers 33 and 34 of the plug, and I have illustrated certain means for this purpose without, of course, intending to confine my invention to the use thereof. To the elbow 68 and to the fitting or coupling 70, there are connected two small pipes 74, 75 which communicate with a pipe 76 extending upwardly into a closed tank 77. At 78 I have indicated a Sprengel air pump or aspirator through which a stream of water is conducted by a pipe 79,—this stream of water being supplied from any suitable source at a more or less constant rate of flow. The pump or aspirator is connected by a pipe 80 with a standpipe 81 projecting upwardly into the tank 77. By means of this apparatus air may be constantly exhausted from the tank 77 so as to maintain a suction in the hollow hubs of the plug and in both chambers 34, 33 of the plug. This suction or minus pressure will evidently be balanced in the two chambers. For the purpose of maintaining a uniformity of minus pressure or suction in the tank 77, the lower end of pipe 81 extends into the upper end of a closed tank 82 in which there is a mercury seal indicated at 83. An air pipe 84 extends from the upper end of the tank to a point below the level of the mercury seal so that a substantially constant suction is maintained in the tank 77 by the admission of atmospheric air through the tank 82. From the lower end of the tank 77 a standpipe 85 extends downwardly either into the cup 73 or into some other suitable cup containing a water seal, so that, if by chance water is drawn into the tank 77, it will be discharged therefrom. The standpipe 72 performs the same function in emitting any water which may find its way through the hollow hub or sleeve 35 of the plug. It will be apparent from the foregoing description that, when the apparatus is in operation and the pump 78 is functioning, a balanced, materially constant suction will be maintained in the two chambers 33, 34 of the plug. The pump 78, the tank 77 and the conduit 74 are utilized to start the flow of water from the chamber 33 to the measuring device or meter by which the rate of flow of water passing through the pulp web or mat on the cylinder mold is measured. This measuring apparatus will subsequently be described.

I provide means for measuring the thickness of the pulp web or mat on the wire of the cylinder mold, for as I have previously explained by multiplying the thickness of this mat by the rate of the flow of water from the cylinder mold, one is able to determine the freeness (and hence of the reciprocal quality, slowness) of the stock. It may be here stated that in lieu of the thickness of the pulp mat any other measure of the quantity of stock picked up by the cylinder mold might be employed, thus obviously the mat could be weighed either with or without a previous drying since there is a direct correlation between the weight of the mat and its thickness. Then the weight multiplied by the water meter reading would indicate the freeness of the stock under observations. Instead, however, of weighing the mat, I prefer, because of greater simplicity, to measure the thickness of the mat. The weight of the mat or the thickness of the mat multiplied by the rate of flow of water from the cylinder mold would indicate accurately the freeness of the stock within a sufficiently wide range. Any suitable mechanism may be utilized for measuring the thickness of the mat on the cylinder mold, but I have shown means for this purpose which are suitable. Inasmuch as the mat is locally compressible, it is desirable that the means for measuring the thickness should engage a relatively large area of the mat so that its pressure will be exerted upon such area. Thus, I find it convenient, as a part of the measuring device, to employ a flexible apron such as indicated at 86. This apron should be made of material which will not corrode, which is sufficiently flexible for the purpose, which itself is substantially non-compressible under the pressures utilized in effecting the measurement of the thickness of the mat, and which is preferably transparent so that the operation of the machine may be observed. While various other materials are suitable for the purpose, yet I have found that an apron of thin celluloid possesses optimum characteristics. This apron is guided by three rolls indicated at 87, 88 and 89, the two rolls 87 and 89 being relatively so arranged that the apron as it travels in the direction of the arrow in Figure 3 will engage the mat of pulp on the upmoving side of the cylinder mold only a short distance above the level of the aqueous stock in the vat, and will pass tangentially from the cylinder mold at a point just beyond the vertical plane of the axis of the mold, so that the apron remains in contact with the stock through an arc of approximately 90°. These rolls are journaled in a pivoted frame comprising two end plates 90, of which one is shown in Figure 3,—the other being a duplicate thereof. These plates are secured together by bolts 91 and are held apart by spacers 92 so that they are maintained in parallelism. The frame as a whole is journaled on a fulcrum consisting of a pipe 93, the ends of which are attached to brackets 94 depending from the bridge 95 connecting the end uprights 37, 38 of the main frame in the vat 25. The roll 88, which functions as a belt tightener as well as a guide, is journaled at each end in a block 96 adjustable in a guideway 97 by means of an adjusting screw 98 journaled in a boss 99 formed on one of the end plates 90. The rolls 87, 88 and 89 may if desired be mounted in roller or ball bearings, but ordinarily this is not necessary since the frictional engagement of the pulp web or mat on the cylinder mold with the apron is sufficient to cause it to move synchronously therewith without slippage between them. Naturally that portion of the apron which engages the stock on the wire of the cylinder mold will move radially of the cylinder mold in accordance with variations in the thickness of the stock. The proportions of the parts are so chosen that, within the limits of the thicknesses of pulp mat encountered in practical operation, the pressure exerted by the apron against the pulp mat is substantially constant and reproducible. Bearing upon the apron 86, there is a roll 100 whose axis is parallel to, and in the vertical plane of the axis of, the cylinder mold. This roller 100 is mounted so as to yield as the apron travels beneath it, and it is journaled in the arms 101 of a yoke 102 which bears against a cylindrical fulcrum 103 socketed in a rectangular frame 104. The yoke 102 is held loosely in place by angle bars 105 secured to the frame 104 by screws 106. With this arrangement the roll 100 is capable of tipping more or less about the axis of the fulcrum 103, in setting up the machine. The frame 104 is guided in its vertical movement by two pairs of parallel links 107, 108. These pairs of parallel links are pivoted to lugs 109, 110 depending from the bridge 95. Preferably the links of one pair, as those at 107, are extended beyond their pivots sufficiently to just about counterbalance the weight of the frame and the roll 100 without however lifting the roll from the apron. By multiplying the movement of the frame 104, the thickness of the pulp mat may be intended on a suitable scale, as will be subsequently explained. For the proper functioning of the cylinder mold and its associated parts, including the apron 86, that portion of the mat of pulp which passes under the apron must be properly stripped and cleaned from the cylinder and provision should be made for preventing the adhesion of pulp to the surface of the apron. The center of the plug 32 is hollow as at 111 and with it communicates a pipe 112 which is passed through a stuffing box 113 on the end of the plug 71 so that water may be introduced into the interior of the plug and delivered through passages 114 to what may be regarded as a manifold 115, as shown in Figure 3. From this manifold 115 a narrow slit or mouth 116 delivers a stream of water to and through the series of slots in the shell of the cylinder mold so as to wash from the Fourdrinier wire or screen the pulp mat which is adhering thereto, as the cylinder slots in the cylinder mold register successively with the mouth 116. At the same time, a supply of water is delivered through a pipe 117 to a series of nozzles 118 by which small streams of washing water are delivered to the exterior of the cylinder mold just above the mouth 116.

The function of the jets of water delivered from the nozzles 118 is to cut the web of pulp into ribbons which are lifted and removed from the wire by the water issuing from the mouth or slit 116. A doctor, which is indicated at 119, is hung by the angle links 120 to a pivot bar 121 held in depending lugs 122 extending downwardly from the bridge 95. The front edge of this doctor (which is more or less trough-shaped in cross section in the rear of said edge) is held yieldingly in close proximity to the periphery of the cylinder mold between the deckles so as to receive the pulp which is removed from the surface of the cylinder mold and to discharge it through an outlet 123. The front ends of the sides of the doctor ride on the peripheries of the deckles so as to maintain the operative edge of the doctor just sufficiently clear of the wire or screen so as not to injure the screen but sufficiently close to receive the stock which is washed from the screen. The doctor is held in this position by a weight 124. The fulcrum 93, upon which the apron-carrying frame is hung, preferably consists of a tube or pipe to which water is delivered from any suitable source and it has a series of ports 125 from which streams of water are delivered to the reentrant angle between the lower stretch of the apron 86 and the roll 87 so as to form therein a small pool in which any stock adhering on the inner surface of the apron may be floated off, and thus preventing the passage of stock with the apron around the roll 87. Similarly, water is introduced into a manifold 126 having a series of nozzles 127 for delivering the water into the angle formed by the apron 86 and the roll 89 so as to ensure the removal of any fibrous material which might otherwise be carried by the inner surface of the belt past the measuring roll 100.

It is manifest from the description of the doctor 119, that if, due to a temporary interruption of the flow of water to the pipe 117, or for some other reason, the pulp mat should stick to the screen, and thus tend to jam in between the doctor and the cylinder mold, and thereby to injure the screen, the doctor would be pushed away from the cylinder mold by the rotation of the latter until the cause of the failure of the stock to be washed completely away had been overcome. The weight 124 would then bring back the doctor to its normal position.

It is apparent from the preceding description that, when the cylinder mold is being rotated at a uniform rate of speed, a mat of fiber is constantly being formed on the cylinder mold and carried between the mold and the apron 86 beneath the roll 100, and that the roll and its frame 104 will be raised and lowered according to the thickness of the pulp mat. As the slowness of the stock increases, the less will be the thickness of the pulp mat upon the cylinder mold, assuming that there is a definite unchanging concentration of stock in the vat and that the temperature of the stock is substantially unvarying.

In determining the slowness of the stock, it is frequently desirable (as previously stated) not only to measure the weight or thickness of the pulp mat formed on the cylinder mold, but also to measure the rate of flow of the white water from the cylinder mold. Any one of several different devices or water meters may be employed for this purpose, and, if desired, provision may also be made for controlling the concentration of the aqueous stock in the vat 25. In Figures 9 to 12 inclusive I have illustrated one form of meter which may be utilized. This consists of an upright tank 130 of any predetermined height, having at its lower end a thimble 131 with a reduced delivery orifice 132. The pipe 69, which receives the white water from the chamber 33 of the plug in the cylinder mold, delivers the white water to the tank 130. In order to prevent so far as possible a disturbance in the contents of the tank 130, the conduit 69 delivers the white water into a seal cup 133 at the side of the tank 130 from which the water flows into the tank at one side of the partition 134 which extends into the lower part of the tank. A sight glass 135 is connected to the thimble 131, adjacent to which there is placed a graduated scale 136. The rate of flow of the water in the orifice 132 from the tank 130 varies with the hydraulic head of the water in the tank, so that, if the column of water in the tank increases in height, water will flow through the orifice 132 at a higher rate; and conversely, as the column of water in the tank 130 decreases, the rate of flow of water through the orifice 132 decreases;—so that by noting variations in the height of the water column in the sight glass 135, it is possible to ascertain the rate of flow from the cylinder mold which is delivered to the tank 130. An equilibrium is established between the rate of flow of white water from the cylinder mold into the tank 130 and the rate of flow of water from the tank through the reduce nozzle 132, and the height of the water column in the tank remains constant during the time that this equilibrium remains constant. By placing a float in the tank 130 and noting variations in the vertical height of the float, the rate of the flow of white water from the cylinder mold through the tank 130 may be indicated. Such a float is shown at 137.

I have now described the means by which the thickness of the pulp mat on the cylinder mold may be measured and the rate of flow of water from the cylinder mold may be measured, and I will now describe an indicating and recording mechanism by which these two factors are multiplied one by the other so as to indicate the slowness of the cellulosic stock where other conditions such as stock concentration and the temperature of the pulp suspension are variable. This mechanism is illustrated by Figures 6 to 8 inclusive. It comprises a rotatable dial 138 upon which is marked a logarithmic scale indicated at 139. The hub of the dial is mounted to rotate freely about a shaft 140 which is journaled at its ends in bearings 141, 142, within a suitable case or cabinet indicated as a whole at 143, one side 144 of which is glazed so that the dial may be seen. An index finger 145 is secured to the shaft 140 so as to rotate therewith, and this finger extends across the logarithmic scale and is provided with an aperture 146 through which the scale may be seen in connection with a mark or center line 147 on the finger. Both the dial and the finger or index are movable about the same axis, each independently of the other, the position of one depending upon the rate of flow of the white water from the cylinder mold and the position of the other depending upon the thickness of the fiber mat on the cylinder mold. Any suitable means may be provided for magnifying the movement of either the float of the water meter or the measuring roll of the thickness meter, those devices which I have herein illustrated merely serving as exemplifications of what may be utilized for the purpose. Securely connected to the shaft 140 upon which the index 145 is mounted, there is a cam 148 against which bears a slide or pusher 150 movable along a guide rod 151 mounted in uprights 152 placed on the base of the cabinet of the instrument. It may be here noted that the base of the cabinet may be formed by the bridge 95 hereinbefore described. To the hub of the dial 138 there is secured a cam 153 so that the two will move together, and with the edge of the cam there is engaged a slide or pusher 154 movable along a guide rod 155 whose ends are secured in the upright brackets 152. The two guide rods 151, 155 are in the same horizontal plane as shown in Figure 7. The cam slide 150 is in threaded engagement with a feed screw 156 journaled in the upright brackets 152, and the cam slide 154 is similarly engaged with a feed screw 157 mounted in like manner. On the end of the feed screw 157 there is a small pinion 158 intermeshing with and driven by a large gear 159 journaled on a stub shaft and having secured to one face thereof a drum 160. Secured to the drum and coiled thereabout is a cord or other flexible connection 161 to which the float 137 is attached, the other end of the cord being provided with a weight 162, so that, as the float in the water meter moves up and down according to variations in the height of the column of water in the water-meter tank, the screw bar 157 will be rotated in one direction or the other by the drum and gearing so as to feed along it the slide or pusher 154, which by reason of its engagement with the cam 153 will move the dial 138 in one direction or the other about its axis of movement.

It is obvious that the order of magnitude of the movement of the thickness-measuring roll is very minute and the force available for operating any micrometer device is very small. Consequently I prefer to employ, for the purpose of moving the dial of the measuring instrument, a separate source of power which is controlled by the measuring roll and therefore by the thickness of the pulp mat on the cylinder mold. An electric motor, having an armature rotatable in one direction or the other according to the supply of current to the field, may be utilized for the purpose. Such a motor is indicated conventionally at 163 and the current therefor may be supplied by a generator indicated conventionally at 164. The rotor of the motor is provided with a pinion 165 intermeshing with and driving a gear 166 on the feed screw 156. Preferably this shaft is sectional and the two sections are adjustably connected by a coupling 167. By causing the rotor of the motor to rotate in one direction or the other, the feed screw 156 may be correspondingly rotated so as to advance or retract the slide 150, and, by the engagement of the latter with the edge of the cam 148, move the index 145 about its axis of movement relatively to the dial 138. The field of the motor is conventionally illustrated at 168 and it is connected to a shunt 169 across the armature circuit which is provided with the resistances 170, 171. The field 168 is connected in multiple with two movable contacts 172, 173, indicated conventionally in Figure 6 but shown in actual construction in Figure 8. At 174, 175 are contacts respectively associated with those at 172, 173, but between which are the spark absorbing resistance shunts 175, 176, as indicated conventionally in Figure 6. The spring contacts 172 and 173 are normally disengaged from their associated contacts 174, 175, so that the rotor of the motor is stationary. Now, if, for example, contact 173 is closed against contact 175, current flows in one direction through the field so as to cause the rotor of the motor to be rotated in one direction; whereas, if the other contacts 172, 174 are closed, current will flow through the field in the opposite direction, and the armature will therefore be rotated in the direction opposite to which it was previously rotated. The contacts 173, 175 are closed or opened under the control of the measuring roll 100. The frame 104 of this roll is connected by a link 177 with one end of a floating lever 178 (see Figure 8), and the other end of said floating lever is connected by a thin leaf spring 179 with an arm 180 on a nut 181 forming a part of a device which for convenience may be called the "hunter". The floating lever 178 is provided with a rigid fork 182 which engages a pin 183 on a switch closer 184 pivoted at 185 between the two pairs of contacts 173, 175, and 172, 174. Assuming that the leaf spring 179 is stationary and that the link 177 should move downwardly, it will be seen that the fork 182 will be moved to the right so as to swing the switch closer 184 about its axis, whereupon a protuberance on the side of the last-mentioned device will engage the spring contact 173 and move it into engagement with the contact 175. Conversely, if the link 177 is stationary and the leaf spring 179 be moved downwardly, the floating lever will be tilted so as to move the fork 182 to the left, first to permit the disengagement of the two contacts 173 and 175, and, then, if the downward movement of the leaf spring is sufficient, to swing the switch closer 184 to the left in Figure 8, to cause the engagement of the contact 172 with the contact 174. The link 177 is moved upwardly or downwardly, as the case may be, by the measuring roll 100 so as to move one or the other of the contacts 173 into engagement with its associated contact and thus close the circuit through the field of the motor and cause the rotor to be rotated in one direction or the other, and thus to move the slide 150 along its guide bar 151 and through the associated cam 148, to move the index 145. It may be here noted that the two cams 153, 148 are held against their respective associated slides by weights 186, 187 and cords 188, 189 coiled about the hubs of the two cams. The nut 181, to which the leaf spring 179 is secured, is in threaded engagement with an upright screw bar 190 the ends of which are mounted in suitable end bearings 191, 192, in a frame indicated at 193, the nut itself being held aaginst rotation by a guide bar 194 with which it is in sliding engagement. The screw bar 190 is provided with a worm wheel 195 in engagement with a worm 196 on the feed screw 156 which is driven by the motor. When the motor is started in one direction or the other by the closing of one or the other of the pairs of contacts 173, 175, and 172, 174, the rotation of the screw bar 156 not only effects the movement of the slide or pusher 150 and the rotative movement of the cam 148 but also causes the rotation of the upright screw 190 so as to feed the nut 181 up or down, as the case may be, a sufficient distance to swing the floating lever 178 about its fulcrum on the end of the link 177 and break the contact. For example, assuming that the link 177, because of the then thickness of the pulp mat on the cylinder mold, has dropped sufficiently to cause the fork 182 to move to the right in Figure 8 far enough so that the switch closer 184 has engaged the contact 173 with the contact 175 and has started the rotation of the rotor of the motor in a direction so as to cause the slide 150 to be moved slowly to the left through the rotation of the screw bar 156. This rotation of the screw bar 156 is imparted to the worm wheel 195 to rotate the screw bar 190 in a direction to move the nut 181 downwardly. The downward movement of the nut soon causes the yoke 182 to be moved to the left so as to open the circuit between the contacts 173, 175, whereupon the motor ceases operation. If, because of a temporary increase in thickness of the pulp mat on the cylinder mold, the link 187 is raised so as to close the circuit between the contacts 172 and 174, the motor will be operated to move the slide 150 to the right and also to rotate the screw bar 190 in a direction to raise the nut 181 sufficiently to break the circuit between the two contacts 172, 174. From this description, it will be seen that a variation in the position of the float in the water meter and a variation in the position of the measuring roll will independently cause the dial and the index to be moved relatively to each other.

The contours of the cams are so chosen that, whereas the motions of the slides are directly proportional in the one case to variations in the head of the water in the water-meter tank and in the other case to variations in the thickness of the pulp mat, the angular positions of the cams are proportional to the logarithms, in the one case of the head of water and in the other case to the thickness of the pulp mat. Since the flow of water through the water meter is proportional to the head raised to a constant power, it is evident that, if one is to multiply the rate of white water flow by the thickness of the pulp mat, the pitch of cam 163 must be chosen with respect to the pitch of the cam 148, so that the sum of the angular displacements of the two cams will give directly a reading on the logarithmic scale 139 of the dial 138 equal to the desired product. In plotting the cam 148, its contour is chosen as a logarithmic spiral of the type: $r = ae^{b\phi}$ where $r$ is equal to the length of any radiant, $a$ is equal to the length of the radiant when the angle $\theta$ is zero, $e$ is the base of natural logarithms and $b$ equals $\frac{1}{\tan.\ \phi}$, where $\phi$ is the constant angle between any tangent to the spiral and the radiant to the point of tangency. The contour of cam 153 is also a logarithmic spiral of the type $r = ae^{b\phi}$, the various symbols being hereinbefore given but differing in numerical value. As the thickness of the pulp mat varies, cam 148 will evidently rotate through an angle until it has assumed a position corresponding to the logarithm of the thickness, and as the float 137 rises or falls in the tank 130, cam 153 will assume an angular position corresponding to a rotation numerically proportional to the logarithm of the head of water in the tank 130 raised to the constant power, before mentioned, as giving the relationship between the rate of flow of white water and the head of water in tank 130. The angular rotations of the two cams are added on the logarithmic scale 139, by the corresponding relative motions of the index and the dial plate, and may be read on the scale through the aperture in the index 145. Now since the addition of the logarithms at once gives the multiplication of the corresponding factors, of pulp thickness and rate of flow, the reading on the scale 139 is clearly directly proportional to the product of the multiplication. Consequently the reading indicates directly either the freeness or slowness (which may be considered to be the reciprocal of freeness) of the pulp under observation. If slowness values are preferred, an inverted logarithmic scale may be used on the dial plate. Both a direct scale and an inverted scale may obviously be simultaneously used in which event both would be concentric and two apertures would be provided in the indicator arm, 145. The combination of the cams, dial plate and the index is equivalent to a circular slide rule.

In order to prevent any breakage of parts in the event that any of the elements comprising the circuit-making and breaking mechanisms should stick and the motor should continue to rotate in one direction or the other after being started, I provide independent means for ultimately breaking the circuit upon the movement of the slide or cam pusher 150 a predetermined distance in one direction or the other. For this purpose the slide or pusher 150 is provided with a pin or projection 197 adapted to engage spaced circuit breakers 198, 199, arranged in the path of movement thereof near the ends of its limit of travel. Each circuit breaker comprises a movable spring-tensioned contact and a stationary contact, these two contacts being arranged in series with the corresponding contacts 172, 174 or 173, 175. If the contacts 173, 175 should be kept temporarily closed, notwithstanding that the hunter nut 181 had been lowered sufficiently to move the switch closer 184 to a neutral position so that the motor would continue to rotate to feed the cam slide 150 to the left, the pin or projection 197 would engage the circuit breaker 198 and interrupt the circuit through the field of the motor. If, however, when this occurred the fork 182 should move the switch closer 184 into position to close the circuit through the contacts 172, 174, a reverse circuit would be established through the field of the motor so as to cause the rotor of the motor to be reversed in rotation, whereupon the slide 150 would be moved to the right and thus permit the circuit breaker 198 to close. During these operations the chances are that the operation of the instrument will be restored to normal either by dislodgment of the foreign matter which caused the parts to stick or otherwise.

In first setting up the instrument, a scratch or mark is made on the guide rod 151 with which the cam pusher 150 registers to indicate the proper relative position of the parts. Then, in case it becomes necessary to change the apron 86 or to make other replacements in the operating parts, a template of known thickness is placed between the measuring roll 100 and the apron, the main switch 200 is closed, and the motor is allowed to rotate until the cam pusher or slide 150 comes to a state of rest. Then the switch 200 is opened, the coupling 167 loosened, and the template removed from between the roll 100 and the apron, and the threaded end of the feed screw 156 is rotated by hand until the slide 150 again registers with the scratch or mark on the guide rod 151, after which the coupling is again fastened. This operation has the effect of restoring the proper relationship of the cam 148 and the thickness-measuring roll.

The flexible connection 161 from the drum 160 to the float 137 in the water meter is made in relatively adjustable sections which may be connected, for example, by a turn-buckle at 201. The cam pusher or slide 154 may be calibrated by placing a mark on the guide rod 155, and, in the event of any stretching of the flexible connection 161 or of wear of parts, the outlet through the meter may be temporarily plugged and water added until the float 137 has assumed a prescribed position, whereupon the turn-buckle 201 may be adjusted until the slide 154 reaches the mark on the rod 155.

While it is preferable that the thickness of the pulp web or mat and the rate of flow of white water from the cylinder mold should be multiplied, one by the other, and indicated by a single instrument in terms of slowness of the pulp, yet it is evident that the two factors referred to could be indicated by separate instruments, in which case the operator would of necessity be required to perform the multiplication of one factor by the other to obtain a product in terms of slowness. Other suitable means may be employed for magnifying the relatively minute movements of the thickness measuring roll and of the float of the water meter in transmitting such movements to indicating and recording mechanisms. An advantage incident to an instrument herein described, in which the movements of these two elements are transmitted to independent but cooperating members, such as a scale and an index of a single instrument is that a single permanent and continuous record may be made of the slowness of the pulp. Instead of operating the feed screw 157 (which moves the slide or cam pusher 154, and hence the cam 153 and the dial 138) directly by the connection of the meter float 137 with the drum, a reversible electric motor and circuit controlling mechanism, such as employed for operating the feed screw 156, may be employed and controlled by the float, in the event that it be desired to magnify to a greater extent the movement of the float in transmitting motion to an indicating or recording mechanism, or to eliminate slight errors otherwise existant and which are due to friction in the rotative and sliding members actuated by the motion of the float.

The instrument as thus far described is designed to indicate the relative slowness of the stock where the consistency of the stock suspension in the vat is variable, that is, where there are varying proportions of the solid and liquid components. If, however, the consistency of the stock suspension be constant, the relative freeness of the cellulosic component of the suspension may be measured, either by the thickness of the pulp mat on the cylinder mold, or else by the rate of flow of the white water, for the thickness and rate of flow, under the conditions of the test, are mutually correlated. In the particular form of water meter shown, in which the head of water is indicative of the rate of flow of the water, since the rate of flow is proportional to the head of water raised to a constant power, it is desirable to employ a logarithmic cam to operate the indicating device,—in this case, the dial; and if the rate of flow alone be taken to indicate the relative slowness of the cellulosic component, the indicating dial, in order to give readings corresponding to those obtained when both the thickness and the rate of flow are taken into consideration, would have a scale corresponding to the square of the original scale and would move relatively to a fixed index finger. Of course, in the event of a sufficiently constant stock concentration, the motion or the position of the float in the water-meter tank could be directly transmitted to an index rotating or passing over a fixed, specially calibrated or calculated scale to give directly freeness or slowness values. For example, if a water-meter such as shown in Figure 9 is used, the meter may be so proportioned that the rate of flow is very nearly proportional to the square of the head of water in the meter tank, and hence a scale directly proportional to the head of water in the tank would be proportional to the square of the rate of flow and hence to freeness. On the other hand, if the stock concentration be constant, the relative slowness of the cellulosic component may be measured and indicated by the thickness of the pulp mat on the cylinder mold, and the movement of the measuring roll would be multiplied in transmission to the index 145, which would move relatively to a fixed dial having a scale thereon. In such event, no logarithmic cam would be necessary, as the movement of the index could be directly proportional to the thickness of the pulp mat, or if desired, the scale of the fixed dial could be in terms of the square of the movement of the index.

Means may be provided for maintaining a given consistency of the stock suspension in the vat 25 within relatively narrow limits, and I have illustrated and shall now describe a mechanism which may be utilized for this purpose, although if an indicating instrument be utilized, such as hereinbefore described, it is not necessary that the stock suspension be maintained at more than an approximate constant point. The consistency of the stock, which may be variable as it is delivered from the beating engine, may be controlled in the vat by varying the relative proportions of the cellulosic component and the water as delivered to the vat, and the ultimate consistency of the pulp suspension in the vat may be controlled by the rate of flow of water through the water meter and by the thickness of the mat on the cylinder mold. In Figure 9, I have illustrated below the tank 130 of the water meter so as to receive the water delivered from the reduced orifice 132 thereof, a tank 202 provided with an emission port 203 which is arcuate in form, as indicated in Figure 10. Cooperating with this port or outlet, there is a segmental gate valve 204 which may be rotated about its axis to vary the effective area of the port 203. The valve spindle 205 is provided with a worm or other form of gearing indicated at 206, with which intermeshes a complemental driving gear 207, which, in the present instance, is illustrated as a worm. This worm is mounted upon a shaft 208 which is illustrated as being driven by bevel gears 209, 210, the latter being mounted upon a shaft 211, having on its end a bevel gear 212, (see Figure 6) which intermeshes with and is driven by the feed screw 156 of the indicating instrument. It will be recalled that the feed screw 156 is rotated in one direction or the other, according to variations in the thickness of the pulp mat on the cylinder mold. It follows, therefore, that as the thickness of this mat is increased or diminished, the gate valve 204 will be moved in one direction or the other to vary the effective area of the port 203. The power transmitting connections are such that as the pulp mat increases in thickness, the gate valve 204 is moved to expose a greater length of the port 203 and, correspondingly, as the thickness decreases the port opening is diminished.

Within the tank 202 there is located a float 213, which controls an air valve located in an air pressure line by which the admission of stock to the vat may be controlled. It will be remembered that the box 23, which is located in the pulp conduit from the beating engine, was described as being provided with a valve 24 controlled by the diaphragm of a diaphragm motor 26. Air is admitted to one side of the diaphragm by a pipe 214 (see Figure 1), from a valve controlled by the float 213. Any suitable float-controlled air valve may be utilized for the purpose. As shown, the valve may comprise a casing 215 with which the pipe 214 is connected, and to which there is also connected a pipe 216 leading from a blower or other form of air compressor, not shown. The port 217 in the body of the casing 215 with which the air supply 216 is connected, is controlled by a ball 218 connected by a link 219 pivoted to the float lever 220, with the end of which the float 213 is pivotally connected. The float lever 220 is preferably pivoted at one end to an arm 221 extending laterally from the valve casing 215. When the float is gradually raised by reason of an accumulation of water in the tank 202 indicating that the rate of flow of water through the cylinder mold is higher than corresponds to the thickness of pulp mat which would have been experienced if the concentration of stock in the slowness-tester vat were of the proper, predetermined magnitude, the ball valve 218 is raised gradually from its seat, permitting a gradually increasing flow of air through the valve casing, and consequently the diaphragm of the diaphragm motor 26 is gradually raised, thereby gradually opening the gate 24 so as to permit an increasing flow of stock from the box 23 into the tank. This results in an increase in the proportion of the cellulosic component in the stock suspension in the vat and a consequent increase in the thickness of the pulp mat picked up by the cylinder mold and a decrease in the rate of flow of water from the cylinder mold. As the mat, however, increases in thickness and brings about a rotation in the feed screw 156 of the indicating instrument, the valve 204 in the tank 202 is gradually opened, thereby permitting an increased rate of flow of water from the tank 202. At the same time, however, there is a decreased rate of flow of water from the water meter tank 130 to the float tank 202, and as a result of these operations, the float 213 falls with the decrease of the head of water in the tank 202 until an equilibrium is established between the supply of stock to the vat and the rate of flow of water from the cylinder and the thickness of the pulp mat on the cylinder mold. It may happen, however, that it is necessary to dilute the stock in the vat 25 in order to maintain a given consistency of stock. This is accomplished by admitting water to the vat, while at the same time the supply of stock is temporarily reduced and pulp is being removed by the cylinder mold. For this purpose, clear water may be supplied from any suitable source through the water pipe indicated at 222 and provided with a diaphragm motor valve 223. Admission of the air to the diaphragm valve from a pipe 224 leading from the compressed air pipe 216 may be controlled by a float 225 in the vat 25 which operates an air valve indicated as a whole at 226, and which is substantially the same in construction as the air valve illustrated in Figure 12 and hereinbefore described. The construction is such that if the level of the stock in the vat drops below a certain predetermined height, the air valve 226 is opened to cause the admission of air to the diaphragm valve 223 and thus permit the flow of clear water into the vat, until the level of the stock therein is sufficiently high to cause the closing of the diaphragm valve 223. The parts are so adjusted that normally the float controlled air valve permits a more or less continuous supply of clear water to the vat at a rate of flow sufficient to compensate for the outflow of water through the cylinder mold plus a slight overflow of water and stock from the vat through an overflow stand pipe 227 located in the vat as shown in Figure 1. Preferably the upper end or inlet of the overflow pipe 227 is vertically adjusted so as constantly to permit an overflow and thus ensure a sufficiently rapid circulation of the stock in the vat. It may be here remarked that means are provided for agitating the stock suspension in the vat. This may be accomplished by any suitable form of agitating mechanism. As illustrated, it may comprise a shaft 49 having stirrers or agitators 228 thereon. The shaft 49, it will be remembered, is driven by the motor from which power is transmitted to the cylinder mold as indicated in Figure 1.

From the foregoing description, it will be seen that means are provided by which the consistency of the stock in the vat may be maintained substantially constant. As thus described, the mechanism for maintaining a predetermined stock consistency may be utilized independently of other features of the invention for the purpose of maintaining a given consistency of any suspension comprising a solid suspended in a liquid independently of the particular characteristics of the suspended solid. It may be further pointed out that the consistency of the stock in the vat is controlled by two factors, namely, the thickness of the mat picked up by the cylinder mold, and the rate of flow of liquid from the cylinder mold. Slowness and temperature of the pulp suspension and head of stock in the vat play no part, within comparatively wide limits, in the consistency control.

I have heretofore pointed out that as water varies in viscosity sharply with changes in temperature thereof, these changes in temperature either must be compensated for, or the stock must be maintained at a given temperature in order to secure the most accurate slowness results. I have illustrated and shall describe means by which either the temperature of the contents of the vat is maintained at a constant point, or else by which, if the temperature of the vat be not maintained constant, the variations in the temperature of the vat contents may be compensated for. It is relatively simple to maintain the stock at a predetermined temperature as this can be accomplished by heating it to a temperature somewhat above the temperature fluctuations of the stock under different normal external thermal conditions. The stock may be heated either by a steam coil or by steam delivered into the vat below the level of the stock therein. At 227' I have illustrated a steam pipe which has a perforated end projecting into the vat near the bottom thereof, and the passage of steam into the vat is controlled by a diaphragm valve indicated at 228'. This diaphragm valve is connected with the air pressure pipe 216 by a branch pipe 229 in which is interposed a temperature responsive relay 230 exposed to the temperature of the stock in the vat. Since such instruments are well known the one conventionally illustrated does not need description more than to state that should the temperature of the stock tend to fall, the diaphragm valve will be operated to permit the entrance of an increased amount of steam, and conversely, that if the temperature of the stock suspension tends to rise, the supply of steam will be diminished. Preferably the instrument may be adjusted so as to maintain the temperature of the stock in the vat at a moderately low point, say about 100° F. Instead, however, of maintaining the stock in the vat at a uniform temperature, the temperature of the stock may be permitted to fluctuate according to different external thermal conditions, in which case, I employ instead of the water meter illustrated in Figure 9, another form of water meter as illustrated in Figures 13, 14 and 15.

Before explaining the form of water meter in which compensation is made for variations in the viscosity of the water due to temperature variations therein, I may call attention to the fact that when the pulp mat is formed on the cylinder mold, the passage of the water therethrough is as though it passed through a mass of capillaries. The flow of water through capillaries, as is well known, depends not only upon the dimensions of the capillaries and upon the head of water, but also upon the viscosity of the water. Consequently, as the temperature of the water varies and the viscosity of the water changes correspondingly, the flow through the capillaries varies. It is for this reason that the temperature of the pulp suspension in the vat must either be kept constant, or if allowed to vary, the changes in the viscosity of the aqueous component of the pulp suspension must be compensated for. A compensation is accomplished by causing the white water from the cylinder mold to flow through a mass of capillaries comparable to the pulp mat on the periphery of the cylinder mold; but due to the fact that the white water may carry with it fabrillæ and fiber fragments, the capillaries would in time become clogged, unless provision is made preferably for periodically reversing the flow of the white water through the capillaries as described below. In Figures 13 to 15, I have illustrated an arrangement in which the tank 202, previously described in connection with the water meter illustrated in Figure 9, is arranged to receive the white water directly from the cylinder mold. The water from this tank is then delivered to a meter comprising a vertical tube 231 in which is located the float 137 connected by the flexible connection 161 with the drum 160 of the indicating instrument. The lower reduced end of the tank 231 is connected by a port 232 with a casing 233 having an outlet 234 near its lower end for the emission of water. This casing is horizontally divided by two partitions, 235, 236. The partition 235 is provided with two ports 237, 238 and the lower partition 236 has the ports 239, 240. Within the casing between the partitions and dividing it into two chambers 241, 242, there is a mass of capillaries indicated at 243, through which the water may flow from one chamber to the other. The partitions 235, 236, divide the casing horizontally to form an upper chamber 243' and a lower chamber 244. Passing through each of the two pairs of ports 237, 239 and 238, 240 are the valve spindles 245, 246, which are loosely connected at their lower ends with a rocker or rocking lever 247. Each valve spindle has valves by which the ports through which it passes are alternately opened and closed, so that when one port is opened, the other is closed, and vice versa. These valves are indicated at 248. If now the water flows from the upright tank 231 into the chamber 243', with the parts in position as shown in Figure 13, it will pass through the port 238, thence through the mass of capillaries 243 and out through the port 239 to the chamber 244, from which it will be discharged through the port 234. The port 234, however, has connected therewith an upright pipe 249 having a U-bend at its upper end from which water is discharged into a vertical funnel 250. Below the funnel 250 so as to receive water discharged therefrom, there is a tilting bucket 251 divided by a central partition into two compartments. This bucket is pivoted at 252 on a suitable support. It is provided with a yoke or fork 253, the fingers of which are adapted to engage a depending arm 254 on the rocker 247. Assuming that the parts are in position shown in Figure 13 and that water is flowing therethrough as previously described, as soon as sufficient water is delivered to the left hand compartment of the bucket, the latter will be tilted to the left, and the fork 253 engaging the arm 254 with the momentum acquired during its movement, will rock the rocker 247 and shift the valve stems 245, 246 so as to open the ports 237, 240 and close the ports 238, 239 so that the water will be caused to flow through the mass of capillaries in the opposite direction, until the bucket is again tilted with a consequent reversal of operation of the valve stems and their valves.

Any convenient method may be practiced in forming the mass of capillaries indicated conventionally at 243. For example, one may employ a plurality of thin tubes, indicated conventionally at 254' in Figure 15, fitting one inside the other, the exterior surfaces of each of the tubes, except the outer tube being provided with fine longitudinal grooves or scratches, which constitute capillaries. When these tubes are nested together, as shown in Figure 15, they may be inserted in a cylindrical aperture formed in the casing between the chambers 241 and 242. Of course, the outer tube of the nest of tubes may likewise be provided with fine longitudinal grooves to form capillaries between it and the enclosing wall within the casing 233.

From the description herein given, it will be evident that the head of water in the tube 231 depends not only upon the rate of flow of white water from the cylinder mold, but also upon the viscosity of the water. The warmer the water and hence the lower the viscosity, the more rapid will be the rate of flow through the meter for a given hydraulic head in the tube 231. This increase in rate of flow due to the decreased viscosity of the water compensates for the increased rate of flow of the aqueous component of the pulp suspension through the fiber mat on the cylinder mold. The head of water in the tube 231 consequently represents the rate of flow of water through the pulp mat in reference to a predetermined standard viscosity of the water. Consequently the effect of temperature of the pulp suspension as affecting the rate of flow of the white water is automatically eliminated. It will further be noted that the greater the rate of flow of water through the capillaries, the greater the rate at which the bucket is tilted and consequently the more frequently is the direction of the flow of water through the capillaries changed to ensure a cleaning action.

As a practical matter in the operation of an apparatus embodying my invention or in the practice of a process embodying my invention, one may employ a water meter as last herein described, in which the factor of temperature fluctuation in the pulp suspension may be disregarded, or one may employ a water meter of the type first herein described, in which case the heating of the pulp suspension in the vat may be automatically controlled so as to maintain the same at a given temperature.

I regard it as important not only that an operator by visual inspection of the indicating mechanism may observe any fluctuations, if any, in the slowness of the pulp, but that also a permanent and continuous record of the slowness of the pulp may be made. Any suitable form of recording mechanism which is controlled by the rate of flow of the white water and by the thickness of the pulp web or mat on the cylinder mold may be employed. I have conventionally and diagrammatically illustrated a recording mechanism which may be utilized in connection with the visual indicating mechanism hereinbefore described. Having reference to Figures 6 and 18, it will be observed that partially encircling the dial 138 there is an electrical resistance which takes the form of a wire formed of nichrome, German silver, or other suitable electrically resistant material, as indicated at 255. This wire or resistance is concentric with respect to the axis of rotation of the index 145 and the dial 138. These two elements are formed of conducting material and each is provided with a brush or finger engaging the wire 255. As a practical matter, the index 145 is long enough so that its end makes contact with the member 255, whereas the dial 138 is provided with a finger 256 which engages the conductor 255. The dial and the finger are insulated one from the other and they are arranged in a circuit which as conventionally shown in Figure 18 comprises the conductors 257, 258, the conductor 257 being connected with the index 145 and the conductor 258 being connected with the dial finger 256. The resistance conductor 255 is arranged in a circuit comprising a battery or other source of current indicated at 259, and a variable resistance 260. The resistance wire 255 is of uniform resistance throughout its length. Indicated conventionally at 261 is a recording potentiometer which is an instrument that is well known and need not be described in detail, more than to state that it is provided with a stylus 262 arranged to mark upon a clock driven chart 263. The local circuit of this potentiometer is indicated as including a battery or source of current 264 and a variable resistance 265. In operation, as there is a variation in the potential between the conductors 257, 258 by reason of the movement of the index 145 and the dial having the finger 256 towards and from each other along the resistance wire 255, the stylus 262 of the potentiometer is automatically operated correspondingly so as to record its movement on the chart 263. From this description, it will be apparent that the recording instrument, of which there may be as many as may be desired, in multiple in the circuit comprising the conductors 257, 258, may be located at any convenient distance from the testing apparatus so as to produce automatically a continuous and permanent record of the slowness of the stock being tested.

From time to time the variable resistances 260 and 265 may be manually adjusted so that the potential drop across the terminals of the resistance conductor 255 and the potential drop across the terminals of the resistance conductor 255' correspond. This adjustment is of course necessitated by the changes in voltage which naturally occur in the usual type of dry cell, such as would normally be used for the local circuit. Instead of having two batteries for the two local circuits, a circuit arrangement might be employed having a single battery 259' as indicated in Figure 19, in which case, one might obviate the use of one or both of the variable resistances 260, 265, since variations in voltage from the source of potential would affect both circuits equally.

In Figure 21 I have illustrated diagrammatically and conventionally another form of recording or indicating mechanism, by which it is possible to obviate the use of the two logarithmic cams 148, 153 of the indicating mechanism. In this instance I provide a resistance coil indicated at 266 along which a contact 267 may be moved by the mechanism under control of the thickness measuring roll, for example by the part utilized as the cam pusher. The resistance 266 is included in a circuit comprising a battery or other source of current 268. Connected with one of the conductors 269, there is another resistance coil indicated at 270 along which a contact 271 is moved by variations in the position of the float of the water meter as by means of the screw-fed slide or pusher. One end of the resistance coil 270 is connected by conductor 272 with the contact 267 and the same end of the resistance coil is connected by conductor 272 with a terminal 273 of an indicating or recording potentiometer or volt meter. The other terminal 274 of this instrument is connected by a conductor 275 with the contact 271. The resistance coil 266 is of uniform resistance per unit of length. The contact 267 is moved a distance directly proportional to the variation in the thickness of the pulp mat on the cylinder mold. The resistance coil 270 is uniform throughout its length if the compensating water meter shown in Figure 13 is employed, but is of varying resistance per unit of length if the non-compensating water meter shown in Figure 9 is used. The contact 271 is operated by the float 137 in each case. The voltage or potential indicated or recorded by the instrument 276 obviously depends upon the positions of the contacts 267 and 271 in reference to their associated resistance coils. It is assumed at the outset that the battery or source of potential 268 is maintained at a predetermined value. The potential between the terminal 278 and the contact 267, from the foregoing description, is seen to be proportional to the thickness of the pulp mat on the cylinder mold. The potential between the contact 271 and the terminal 277, on the other hand, depends not only on the length of the resistance included between the contact 271 and the terminal 277, but also upon the potential between the terminal 278 and the contact 267. If the resistance between the terminal 277 and the contact 271 is directly proportional to the rate of flow of white water through the water meter, it is evident that the net potential between the terminals 273 and 274 is directly proportional to the resistance between 267 and terminal 278 multiplied by the resistance between terminal 277 and contact 271. Since these two resistances are, as explained, directly proportional respectively to the thickness of the pulp mat and to the rate of flow to the white water, the potential or voltage drop across the terminals 273 and 274 is directly proportional to the product of the multiplication of the thickness of the pulp mat by the rate of flow of white water and hence is inversely proportional to the slowness, which as previously defined is the measure of the resistance of the flow of water through the pulp mat.

In addition to indicating the slowness of the stock and variations which occur therein, it is desirable automatically to warn the beater engineer of variation of the slowness of the stock from the desired value, or to control the operation of the beating engine so as to maintain a predetermined pulp slowness, or to do both, and I have illustrated more or less conventionally and diagrammatically, instrumentalities by which this may be accomplished. I have selected for the purposes of illustration a beating engine of the type known as a Jordan engine, this beating device as a whole being indicated at 20 in Figure 18. The variations in the slowness of the pulp which pass through this instrumentality may be effected by adjusting the rotor thereof longitudinally of the frusto conical casing or shell. The construction of beating engines of this character is well known so that it is sufficient merely to state that the rotor thereof is rotated at the desirable rate of speed from any suitable source of power, such for example as by an electric motor 280 mounted at the end of the beating engine and arranged to slide on suitable ways when the rotor is adjusted. Stock entering the beating engine through the inlet pipe 21 is delivered from the engine through the outlet conduit 22. The longitudinal adjustment of the rotor of the beating engine is automatically controlled, the power utilized for effecting this adjustment being supplied by a comparatively small electric motor 281. From this motor as will subsequently be explained, power is transmitted to a shaft 413 having a pinion 414 by which a feed screw 1414 engaging a slidable bearing 1415, adjusts the rotor. A pinion 1416 on the feed screw, which is journaled on the stationary frame, through an idler gear 1417, drives a pinion 1418 on a feed screw 1419 threaded into a nut on the sliding frame of the motor 280. The relation of parts is such that when the pinion 414 is rotated in one direction or the other the rotor of the beating engine and its operating motor are simultaneously adjusted to the same extent in one direction or the other. I will now explain the electric mechanism by which the adjusting wheel 415 of the Jordan 20 is caused to rotate in one direction or the other to compensate for variations in the slowness of the stock in the tester vat 25 from the desired standard of slowness. This mechanism is directly controlled, according to the present embodiment of the invention, from the indicator by which the slowness of the stock is indicated. At 282 is indicated conventionally what may be called a control box in which a portion of the controlling mechanism is located. Within this box there is located a potentiometer circuit including the uniform electrical resistance wire 283, terminals of which are in a local circuit including a battery or source of potential 284 and a variable manually adjustable resistance 285. In series with the contact arm 286 of the potentiometer circuit in the control box is the movable, high resistance coil 287 of a polarized relay. Concentric with the resistance wire 283 is a scale 288 graduated so as to correspond with the scales of the dial plate of the indicating mechanism and with the charts of the recording potentiometer. Now the variable resistance 285 is adjusted so that the drop in potential across the terminals 289 and 290 of the control potentiometer circuit is equal to the drop in potential across the corresponding terminals of the resistances 255 and 255'. The index arm 286 is manually set at that point on the scale corresponding to the desired slowness of the stock delivered from the beating engine. If the slowness in the vat of the testing machine is materially different from the desired value, there will pass through the movable coil 287 an electric current which depends in magnitude and direction upon the degree and sign of the difference between the slowness of the pulp as delivered from the beating engine, and the desired value of the slowness. The coil 287 will consequently be propelled upward or downward towards one or the other of the two stationary coils 291, 292, which are arranged in a local circuit including a battery or source of power 293. In lieu of the electromagnets indicated at 291 and 292, permanent magnets may be employed if desired. The movable coil 287 is supported at one end of a lever 294 fulcrumed on a pivot 295 and bearing at its other end a switch closer 296. The lever, in order that it may be accurately poised or balanced, is provided with a counterweight 297 and also may be provided with a plunger 298 operating in a dash pot 299 to more or less damp the impulses imparted to the lever. The lever 294 of the relay controls the passage of current through the electromagnets 408, 409 which in turn control the adjustment of the Jordan rotor relative to its shell.

The pairs of contacts 309 and 310 (which may be bridged by spark absorbers 311, 312 respectively) are electrically connected respectively to the solenoids 408 and 409, and to a source of electric current 308 through the timing device indicated as a whole at 400 and which will be subsequently described. The contacts 309 and 310 are conventionally shown as leaf-springs which tend to remain open unless closed by the switch closer 296. (Any other suitable type of contact may of course be used, such, for example, as the telegraph relay type shown in Figure 23 in which the lever 294 forms a part of the circuit when the closer 296 engages one or the other of the contacts 309, 310, being itself connected to the lead 500). The comparatively small motor 281, (Figure 18), which furnishes the power for adjusting the position of the Jordan rotor relative to the shell of the beating engine, is connected directly to a source of current, and constantly rotates, thereby causing the worm gear 401 in mesh with worm 402 to turn. Eccentric on the worm gear shaft is the pin 403 which acts as a pivot for the yoked link 404 which reciprocates with every revolution of the worm gear shaft. Pivotally connected to the left arm of the yoke is the link 405, which, in turn, is similarly connected to link 406, pivotally suspended from the support 407. At the lower end of link 406 are pivotally connected the solenoid armatures 306, 307. Two leaf springs 410, 411 bring the link 406 into a vertical position when the solenoids 408, 409 are inoperative.

The yoke of link 404 bridges the double-faced ratchet wheel 412 securely mounted on shaft 413 and to which is also keyed spur gear or pinion 414 in mesh with the gear 415 previously described. The fingers 416, 417 of the yoke reciprocate in a vertical plane at right angles to the faces of the ratchet wheel 412 and passing through the latter to one side of the center.

If the slowness desired is less or greater than the actual slowness, the polarized relay in control box 282 will cause either contacts 309 or 310 to close, thus energizing solenoid 408 or 409. The corresponding armature 306 or 307 will then be pulled toward the energized solenoid, causing, by means of the links 406, 405, the yoke 404 to rotate to the right or to the left until the finger 416 or 417 engages the teeth of the ratchet wheel. The latter will be rotated in one direction or the other as the yoke 404 reciprocates until upon the opening of the contacts 309 or 310, the spring 410 or 411 brings the link 406 into a vertical position. The rotation of the ratchet wheel 412 effects a corresponding rotation of the gear 414 which in turn operates the adjusting wheel 415 so as to push the rotor of the beating engine toward the shell if the slowness is too low, or to pull the rotor away from the shell if the slowness is too high.

To prevent injury to the beating engine or to the associated mechanism, there is interposed in one of the feed wires 418 of the Jordan rotor circuit, which in Figure 18 is shown as a two-phase system, a current transformer 418' to the low current circuit of which are connected two solenoids 416, 417. If the Jordan rotor has been brought too close to its shell, the current in the feed wire 418 will rise to a comparatively high value, thereby energizing solenoid 416 sufficiently to pull its armature 419, which is pivotally connected to the link 420, down against the opposing tension of the vertically adjustable helical spring 421. The leaf spring contacts 422 and 423 thereupon open, breaking the circuit which energizes solenoid 408. It is assumed that when the link 406 is pulled to the left, the beater adjusting mechanism operates so as to bring the rotor closer to the shell. If the current in the feed wire 418 is sufficiently great, the solenoid armature 419 may be further pulled into the solenoid 416, until contacts 424, 425 are closed, whereupon the solenoid 409 becomes energized, and, as a result, the adjusting mechanism causes the rotor of the beater to recede from the shell until the current in 418 is below the predetermined danger limit. If on the other hand the rotor, for some reason or other, is pulled too far out, the current in feed wire 418 will drop to a comparatively low value, whereupon solenoid 417 will become but weakly energized so that the armature 426, which is pivotally connected to the link 427, may be pulled out of the solenoid by reason of the tension in the vertically adjustable helical spring 428. Contacts 429 and 430 will thereupon separate, so as to interrupt the current through solenoid 409, allowing the link 406 to return to its vertical position, and thereby discontinuing the lateral separation of the rotor and shell of the beater (see also Figure 23).

In order to stabilize the automatic control of the Jordan, it is preferred to insert in the circuit including the solenoids 408, 409 a timing mechanism which permits the operation of the solenoids during only a few consecutive seconds in, say, every two or three minutes, so that sufficient time may elapse after each comparatively slight adjustment to the Jordan rotor to permit the desired slowness changes to become manifest in the slowness testing machine. One form of timing mechanism is shown in Figure 20, there indicated as a whole at 400, and is electrically connected to the control system through leads 500, 501. It consists of a fiber disk 431 concentric with and driven by the slowly rotating worm gear 432 in mesh with the worm 433, which is mounted on the shaft of worm gear 401. The fiber disk 431 has fitted at its periphery the metal segment 434. A metal brush 435 presses against the periphery of the disk; another similar brush 436 presses against the metal hub 437 of the disk 431. The hub and the metal segment 434 are electrically connected through a metallic strip, fastened to the face of the fiber disk. The dimensions of the various parts are so proportioned that the brushes 435 and 436 are in electrical contact through the metal segment 434, metallic strip, and hub 437 but a predetermined portion of the time of each revolution of the fiber disk.

It will be noted that although the timer 400 disconnects the solenoids 408 and 409 from the beater adjustment control circuit during part of the time, the contacts 424 and 425 may cause the rotor of the beater to be pulled away from its shell at any time whenever the current in 418 exceeds a predetermined value.

Instead of the automatic control mechanism, a system of lights may be used to signal the beater engineer if the slowness of the pulp being processed varies from the desired value. In this case the lever 294 of the relay controls the passage of current through the lamps 503, and 504, Figure 22, one of which may be colored, say red, and the other green. According as the slowness is too low or too high, one pair of contacts 309, 310 will be closed by the switch closer 296, causing either light 503 or 504 to shine.

Of course the automatic control mechanism shown in Figures 18 and 20 and the signal system diagrammatically shown in Figure 22 may be used together.

From the foregoing description, it will now be apparent to those skilled in the art that the beating engine may be automatically controlled so as to produce a stock having a predetermined value of slowness; that the control of the beating engine is regulated according to the resistance to the passage of water through the pulp mat on the cylinder mold of the testing machine, and that in the particular form shown, the control of the beating operation is dependent upon either or both of two essential factors, namely, the thickness of the pulp web or the mat on the cylinder mold, and the rate of flow of white water from the cylinder mold. If the consistency of the stock in the testing vat is maintained constant by mechanism as herein described and compensation is made for variations in the temperature of the stock undergoing testing or a water meter of such character is employed so that fluctuations in the temperature of the stock may be disregarded, it is evident, as previously stated, that the control of the operation of the beating engine may depend either upon the thickness of the pulp web or mat on the cylinder mold or else upon the rate of flow of white water from the cylinder mold.

It must be evident to those skilled in the art that the several instrumentalities which I have hereinbefore described may be greatly varied in species without departing from the spirit and scope of the invention as set forth in the claims. Merely for the purpose of illustrating variations in certain of the instrumentalities I have shown conventionally and diagrammatically in Figures 16 and 17 other mechanisms for controlling the density or concentration of the pulp suspension in the testing vat. Referring now to Figure 16, there are provided two resistance coils indicated at 313, 314. Coil 313 is of uniform electrical resistance throughout its length and is arranged in a local circuit provided with a battery or other suitable source of potential 315. The coil 314, which is uniform in electrical resistance if the capillary type of water meter shown in Figure 13 is employed, but which is of varying resistance if the non-compensating type of water meter shown in Figure 9 is employed, is in a circuit which includes the movable contact 316, the solenoid 317 and the movable contact 318. The position of the contact 318 on the coil 313 is controlled by the thickness of the pulp mat on the cylinder mold. Similarly the position of the contact 316 on the coil 314 is controlled by the position of the float 137 in the water meter tank. Now by Ohm's law the strength of the current in the solenoid 317 is directly proportional to the potential between the terminal 319 and the contact 318, and inversely proportional to the resistance of the circuit comprised by that part of the coil 314 between the terminal 319 and the contact 316 and the windings of the solenoid. It may be stated at this point that the resistance of the coil 314 is made purposely high compared with the resistance of the coil 313, so that the potential between the terminal 319 and the contact 318 is for any normal position of the contact 318 or contact 316 substantially proportional to the length of the coil between terminal 319 and contact 318. Unless the thickness of the pulp mat on the cylinder mold corresponds to the rate of flow of white water which would be associated with the given thickness at the desired stock density in the vat, the current flowing through the windings of the solenoid 317 will be stronger or weaker than a predetermined value and in this event, the solenoid armature 320 will either be drawn upward by the solenoid or will be permitted to drop under tension of the spring 321 and will accordingly operate the relay valve 322. This relay valve is of the type illustrated in Figure 12 and is substantially as heretofore described and has the same reference characters applied thereto. It is obvious that the auxiliary tank and associated float 213 as shown in Figure 9 are not needed with the controlling mechanism just described. In order to allow for the constant resistance of the solenoid windings at 317, a corresponding resistance of the coil 314 is bridged by a low resistance shunt indicated at 323, and the coil 314 is so proportioned that the resistance shunted by the circuit 323 is lower than that which corresponds to the minimum flow of white water to be experienced during the operation of the tester.

A second alternative method for controlling the density of the stock in the slowness tester vat, which may be used to advantage in connection with a water meter of the type illustrated in Figure 9, is shown in Figure 17. The difference between the two devices shown in Figures 16 and 17 may be pointed out as follows: A stationary coil indicated at 324 is located in a circuit indicated at 325' which forms a shunt between the terminal 319¹ and the movable contact 318¹ the position of which along the coil 313¹ is controlled by the thickness of the pulp mat on the cylinder-mold. The coil 313' is uniform in electrical resistance throughout its length and the length of coil included between terminal 319¹ and the contact 318¹ is proportional to the thickness of the pulp mat. A movable coil 325 is included in series with the contacts 316¹, 318¹, and is mounted upon the end of the lever 220 of the air valve or relay. The resistance coil indicated at 314¹ is uniform throughout its length and the position of the contact 316¹ is controlled by the head of water in the water-meter tank, the number of turns of the coil 314¹ included between the terminal 319¹ and the contact 316¹ being proportional to the head of water. The magnetic force of attraction between the fixed coil 324 and the movable coil 325 is substantially proportional to the product of the intensities of the currents flowing through the respective coils; since the resistances of the solenoid windings are substantially constant, the current through coil 324 is directly proportional to the potential between terminal 319' and contact 318' and hence is directly proportional to the thickness of the pulp mat on the cylinder mold. The short-circuited portion of the uniform resistance coil 314' is equal in resistance to the windings of coil 325; and the resistance in the circuit comprised by the coil 325 and that part of coil 314' between the contact 323' and contact 316' is hence substantially proportional to the thickness of the pulp mat divided by the head of water in the slowness tester tank. The attraction between the two coils 324, 325 is hence proportional to the square of the thickness of the pulp mat divided by the head of water in the water meter tank. Since the dimensions of the water meter, which, it will be remembered is of the type illustrated in Figure 9, may be chosen so that the rate of flow of water through it is very nearly equal to the square root of the hydraulic head in the meter-tank, it follows that should the rate of the thickness of pulp material to the rate of flow of water vary from a predetermined value, the attraction between the coils 324, and 325 will cause the air-valve or relay 220 to operate so that to increase or diminish the supply of stock to the slowness tester vat. In practice this results in the operation of the lever 220 to control the supply of stock to the tester vat so as to maintain a given density or concentration of stock therein.

The advantage of the control circuit shown in Figure 17 over the one shown in Figure 16 lies in the fact that coil 314¹ is uniform in resistance throughout its length whereas coil 314 is of varying resistance when associated with the water meter shown in Figure 9.

For convenience of phraseology I have referred to the body to be tested as aqueous pulp, or a pulp suspension or a solid suspended in a liquid,—meaning thereby to include not only a suspension comprising cellulose or equivalent fibers and water, but other suspensions of a liquid and a solid. In order that the characteristic of slowness of the solid component may be tested, if this be required, it must be capable of "forming" on a screen so that the liquid may pass therethrough.

I have herein stated that means are provided for automatically compensating for variations in the viscosity of the water flowing through the pulp mat, or for preventing changes in the viscosity by maintaining a substantially constant temperature of the pool of pulp suspension, but obviously I may do both, that is, the pulp suspension may be heated by steam to a predetermined temperature, and also the outflowing liquid after passing through the pulp mat may be caused to pass through the capillaries as illustrated in Figure 13, so that should one means for accomplishing the desired results fail, for any reason, the other will ensure the desired result.

Reverting once more to the indicating mechanism shown in Figure 6 which includes the two slides 150 and 154 which are responsive to variations in the thickness of the pulp mat and in the rate of flow of the white water respectively, it is evident that by placing properly graduated scales on the guide rods 151, 155, direct readings of the movements of said slides may be obtained proportional to the said variations. Thus each slide may be an indicator for showing variations in the position of the element by which it is controlled;—that is either by the meter float 137 which measures the rate of flow of the white water, or the thickness measuring roll 100. Since each slide through the cam and the index or dial, as the case may be, controls the potential of the operating circuit for the recording mechanism and the mechanism which regulates the intensity of the beating operation, the operation of the recording mechanism and the operation of the beater controlling mechanism is responsive to variations in the rate of flow of the white water or to variations in the thickness of the pulp mat or both, for it will be remembered that when the hydrostatic head and the stock concentration in the vat are each substantially constant, the movement of either slide may be relied on to indicate the slowness of the pulp.

In using the term "indicator" or "indicating" in the appended claims I intend, unless the context is clearly to the contrary, to include any form of device or contrivance or any method by which a condition or change in condition is made manifest, whether visually or otherwise, including an index and a scale, a record-making device, or other attenton-attracting devices.

Having thus explained the nature of my invention and how it may be practiced and constructed and operated without attempting to set forth all of the ways in which it may be made or all of the modes of its use or practice, what I claim is:

1. A process of ascertaining the slowness of aqueous pulp, which comprises forming a layer of the solid component thereof on a foraminous screen, and noting the thickness of such layer on said screen.

2. A process of ascertaining the slowness of aqueous pulp, which comprises forming a layer of the solid component thereof, causing the flow of the liquid component therethrough, and noting the thickness of the layer and the rate of flow of the liquid.

3. A process of ascertaining the slowness of aqueous pulp, which comprises continuously forming a layer of the solid component upon a travelling screen, and noting the thickness of such layer on said screen.

4. A process of ascertaining the slowness of aqueous pulp, which comprises continuously forming a layer of the solid component upon a travelling screen, causing the flow of the liquid component therethrough, and noting the rate of such flow of the liquid component.

5. A process of ascertaining the slowness of aqueous pulp, which comprises continuously forming a layer of the solid component upon a travelling screen, causing the flow of the liquid component therethrough, noting the rate of such flow of the liquid component, and noting the thickness of such layers.

6. A process of ascertaining the slowness of aqueous pulp, which comprises simultaneously continuously forming a layer of the solid component thereof on a travelling screen and causing the liquid component to flow therethrough, and simultaneously indicating variations in the thickness of said layer and in the rate of flow of such liquid component.

7. A process of ascertaining the freeness of aqueous pulp, which comprises simultaneously continuously forming a layer of the solid component thereof on a travelling screen and causing the liquid component to flow therethrough, and simultaneously indicating variations in the thickness of said layer and in the rate of flow of such liquid component in terms of the products of the multiplication of such thickness by such rate of flow.

8. A process of ascertaining the slowness of aqueous pulp, which comprises continuously forming a layer of the solid component upon a travelling screen while maintaining a substantially constant concentration of the body of such aqueous pulp, and noting the thickness of such layer on said screen.

9. A process of ascertaining the slowness of aqueous pulp, which comprises continuously forming a layer of the solid component upon a travelling screen, while maintaining a substantially constant concentration of the body of such aqueous pulp, and noting the rate of flow of the liquid component thereof through such layer.

10. A process of ascertaining the slowness of aqueous pulp, which comprises forming and maintaining a pool of such aqueous pulp at a substantially constant level, causing the solid component thereof to form in a mat on a travelling screen and the liquid component to flow through such mat, and noting the rate of flow of such liquid.

11. A process of ascertaining the slowness of aqueous pulp, which comprises forming and maintaining a pool of such aqueous pulp at a substantially constant level, causing the solid component thereof to form in a mat on a travelling screen and the liquid component to flow through such mat, and noting the rate of flow of such liquid and the thickness of said mat.

12. A process of ascertaining the freeness of aqueous pulp, which comprises forming and maintaining a pool of such aqueous pulp at a substantially constant level, causing the solid component thereof to form in a mat on a travelling screen and the liquid component to flow through such mat, and indicating in terms of the products of such factors the rate of flow of such liquid multiplied by the thickness of such mat.

13. A process of ascertaining the slowness of aqueous pulp, which comprises forming and maintaining a pool of such aqueous pulp at a substantially constant level, causing the solid component thereof to form in a mat on a travelling screen and the liquid component to flow through such mat, noting the rate of flow of such liquid, and eliminating variations in such rate of flow arising from the fact that the viscosity of the liquid changes with the temperature thereof.

14. A process of ascertaining the slowness of aqueous pulp, which comprises constantly supplying a stream of such aqueous pulp to form a pool thereof, partially submerging a continuously moving screen in such pool and causing the solid component of such pulp continuously to form in a layer on said screen and the liquid component to pass through such layer, and indicating variations in such layer on said screen.

15. A process of ascertaining the slowness of aqueous pulp, which comprises constantly supplying a stream of such aqueous pulp to form a pool thereof, partially submerging a continuously moving screen in such pool and causing the solid component of such pulp continuously to form in a layer on said screen and the liquid component to pass through such layer, and indicating variations in the rate of flow of such liquid through such layer.

16. A process of ascertaining the slowness of aqueous pulp, which comprises constantly supplying a stream of such aqueous pulp to form a pool thereof, partially submerging a continuously moving screen in such pool and causing the solid component of such pulp continuously to form in a layer on said screen and the liquid component to pass through such layer, maintaining a substantially constant concentration of the aqueous pulp in said pool, and indicating variations in the rate of flow of such liquid through said layer.

17. A process of ascertaining the slowness of aqueous pulp, which comprises constantly supplying a stream of such aqueous pulp to form a pool thereof, partially submerging a continuously moving screen in such pool and causing the solid component of such pulp continuously to form in a layer on said screen and the liquid component to pass through such layer, maintaining a substantially constant concentration of the aqueous pulp in said pool, and simultaneously indicating variations in the thickness of such layer and in the rate of flow of such liquid therethrough.

18. A method of ascertaining the slowness of cellulosic material, which comprises continuously forming into a mat the cellulosic component of an aqueous pulp and passing the liquid through the mat, and noting the variations in thickness of the mat and variations in the rate of flow of the liquid.

19. A method of ascertaining the freeness of cellulosic material, which comprises continuously forming into a mat the cellulosic component of an aqueous pulp and passing the liquid through the mat, and simultaneously indicating the product of the multiplication of the thickness of such mat by the rate of flow of liquid therethrough.

20. A method such as described, which comprises beating a suspension of fibrous material, substantially continuously measuring the slowness of the beaten material, and automatically controlling the beating of said material.

21. A method such as described, which comprises beating a suspension of fibrous material, substantially continuously measuring the slowness of the beaten material, and automatically controlling the beating of said material by the measuring operation to maintain a substantially constant slowness thereof.

22. A method such as described, which comprises beating a suspension of fibrous material, substantially continuously forming a mat of said fibrous material, substantially continuously passing the liquid of said suspension through said mat, and automatically controlling the beating of said suspension by the thickness of said mat.

23. A method such as described, which comprises beating a suspension of fibrous material, substantially continuously forming a mat of said fibrous material, substantially continuously passing the liquid of said suspension through said mat, and automatically controlling the beating of said suspension by the rate of flow of said liquid through said mat.

24. A method such as described, which comprises beating a suspension of fibrous material, substantially continuously forming a mat of said fibrous material, substantially continuously passing the liquid of said suspension through said mat, and automatically controlling the beating of said suspension by the thickness of said mat and the rate of flow of said liquid.

25. A method as described, which comprises beating a suspension of fibrous material, continuously forming a mat of the beaten fibrous material on a travelling screen, continuously passing the liquid of such suspension through said screen, and automatically controlling the beating operation in accordance with variations in the thickness of said mat.

26. A method as described, which comprises beating a suspension of fibrous material, continuously forming a mat of the beaten fibrous material on a travelling screen, continuously passing the liquid of such suspension through said screen, and automatically controlling the beating operation in accordance with variations in the rate of flow of said liquid through said mat.

27. A method as described, which comprises beating a suspension of fibrous material, continuously forming a mat of the beaten fibrous material on a travelling screen, continuously passing the liquid of such suspension through said screen, and automatically controlling the beating operation in accordance with variations in the thickness of said mat and the rate of flow of said liquid therethrough.

28. A method as herein described, which comprises causing an endless screen to travel into, through and out of a suspension of fibrous material, causing such fibrous material to form a web on said screen, causing the liquid of such suspension to pass through said mat, and measuring the thickness of said mat when it has emerged from such suspension and the rate of flow of said liquid.

29. A method as herein described, which comprises substantially continuously delivering a pulp suspension to a pool thereof, continuously and separately removing pulp and liquid from said pool, and automatically maintaining a substantially constant concentration of the suspension in said pool.

30. A method such as herein described, which comprises forming a pool consisting of a pulp suspension, substantially constantly delivering pulp suspension thereto, continuously forming said pulp into a mat and passing the liquid of said suspension therethrough and out of said pool, and automatically controlling the supply of pulp suspension by the rate of flow of said liquid through said pulp mat.

31. A method such as herein described, which comprises forming a pool consisting of a pulp suspension, substantially constantly delivering pulp suspension thereto, continuously forming said pulp into a mat and passing the liquid of said suspension therethrough and out of said pool, and automatically controlling the supply of pulp suspension by the rate of flow of said liquid through said pulp mat and by the thickness of the pulp mat.

32. A method such as herein described, which comprises forming a pool consisting of a pulp suspension, substantially constantly delivering pulp suspension and diluting liquid thereto, continuously forming said pulp into a mat and passing the liquid of said suspension therethrough and out of said pool, and automatically controlling the supply of pulp suspension and automatically maintaining said pool at a substantially constant level by controlling the inflow of diluting liquor.

33. A method such as herein described, which comprises forming a pool consisting of a pulp suspension, substantially constantly delivering pulp suspension thereto, continuously forming said pulp into a mat and passing the liquid of said suspension therethrough and out of said pool, and automatically controlling the supply of pulp suspension and automatically compensating for variations in the viscosity of said liquid.

34. A method such as herein described, which comprises forming a pool consisting of a pulp suspension, substantially constantly delivering pulp suspension thereto, continuously forming said pulp into a mat and passing the liquid of said suspension therethrough and out of said pool, automatically controlling the supply of pulp suspension by the rate of flow of said liquid through said pulp mat and by the thickness of the pulp mat, and automatically maintaining said pool at a substantially constant temperature.

35. A method of ascertaining the slowness of pulp, which comprises measuring the resistance of such pulp to the flow of water therethrough, by forming a mat of such pulp and causing water to flow therethrough, measuring the thickness of such mat and the rate of flow of the water through it, and noting the reciprocal of the product of multiplication of the thickness of the mat by the rate of flow of the water.

36. A method of ascertaining the freeness of pulp, which comprises forming the pulp of a suspension thereof of a predetermined concentration into a mat, passing the liquid of such suspension under a constant head through said mat, measuring the thickness of the web and the rate of flow of the liquid, and multiplying the said thickness by the said rate of flow.

37. A method of ascertaining the freeness of pulp, which comprises forming the pulp of a suspension thereof of a predetermined concentration into a mat, passing the liquid of such suspension under a constant head through said mat, measuring the thickness of the web and the rate of flow of the liquid, and automatically multiplying the said thickness by the said rate of flow and indicating the product.

38. A method of determining certain characteristics of a solid suspended in liquid, which comprises continuously forming the solid into a mat, causing the liquid to flow under a substantially constant head through the mat during its formation, measuring the resistance to the flow of the liquid through the mat and removing the mat from the liquid.

39. A method of determining certain characteristics of a solid suspended in liquid, which comprises continuously forming the solid into a mat, causing the liquid to flow under a substantially constant head through the mat during its formation, and measuring such characteristics by ascertaining the thickness of the formed mat and the rate of flow of the liquid.

40. A method of determining certain characteristics of a solid suspended in liquid, which comprises continuously forming the solid into a mat, causing the liquid to flow under a substantially constant head through the mat, and measuring such characteristics by automatically measuring variations in the thickness of the mat, automatically measuring variations in the rate of flow of the liquid, and simultaneously indicating on one scale the said variations.

41. A method of determining certain characteristics of a solid suspended in liquid, which comprises maintaining a predetermined ratio of the liquid and solid in a pool of the suspension, continuously forming the solid into a layer or mat in the pool and removing the layer or mat from the pool, causing the liquid of the suspension to flow through the mat or layer at a substantially constant head before the mat or layer is removed, and measuring variations in the thickness of the said mat or layer immediately after it is removed from the pool.

42. A method of determining certain characteristics of a solid suspended in liquid, which comprises maintaining a predetermined ratio of the liquid and solid in a pool of the suspension, continuously forming the solid into a layer or mat in the pool and removing the layer or mat from the pool, causing the liquid of the suspension to flow through the mat or layer at a substantially constant head before the mat or layer is removed, and measuring the rate of flow of said liquid through said mat or layer.

43. A method of determining certain characteristics of a solid suspended in liquid, which comprises maintaining a predetermined ratio of the liquid and solid in a pool of the suspension, continuously forming the solid into a layer or mat in the pool, causing the liquid of the suspension to flow through the mat or layer at a substantially constant head, measuring the resistance of the mat or layer to the flow of liquid therethrough, and removing the layer or mat from the pool.

44. A method as described, which comprises beating cellulosic material in water, continuously forming a pool of the beaten material, continuously forming the cellulosic material in said pool into a mat, causing the water in said pool to pass through said mat at a substantially constant head, controlling the intensity of the beating operation in accordance with variations in the resistance of the mat to the flow of liquid therethrough, and removing the mat from the pool.

45. A method as described, which comprises beating cellulosic material in water, continuously forming a pool of the beaten material, continuously forming the cellulosic material in said pool into a mat, causing the water in said pool to pass through said mat at a substantially constant head, ascertaining the resistance of the mat to the flow of the water thereto, controlling the beating operation to maintain said resistance substantially constant, and removing said mat from said pool.

46. A process of ascertaining the slowness of an aqueous pulp, which comprises maintaining a substantially constant concentration of such pulp in a pool at a substantially constant level, continuously forming the solid component of such pulp into a mat, causing the liquid component to flow from said pool at a substantially constant head through said mat, removing the mat from the pool and automatically measuring the thickness of said mat immediately after its removal.

47. A process of ascertaining the slowness of an aqueous pulp, which comprises maintaining a substantially constant concentration of such pulp in a pool at a substantially constant level, continuously forming the solid component of such pulp into a mat, causing the liquid component to flow from said pool at a substantially constant head through said mat, automatically measuring the rate of flow of said liquid, and removing the mat from the pool.

48. A process of ascertaining the slowness of an aqueous pulp, which comprises maintaining a substantially constant concentration of such pulp in a pool at a substantially constant level, continuously forming the solid component of such pulp into a mat, causing the liquid component to flow from said pool at a substantially constant head through said mat, removing the mat from the pool, and automatically measuring the thickness of said mat and the rate of flow of said liquid.

49. A process of ascertaining the slowness of an aqueous pulp, which comprises maintaining a substantially constant concentration of such pulp in a pool at a substantially constant level, continuously forming the solid component of such pulp into a mat, causing the liquid component to flow from said pool at a substantially constant head through said mat, removing the mat from the pool, and automatically indicating the resistance of the said mat to the flow of said liquid therethrough.

50. A process of ascertaining the slowness of an aqueous pulp, which comprises maintaining a substantially constant concenetration of such pulp in a pool at a substantially constant level, continuously forming the solid component of such pulp into a mat, causing the liquid component to flow from said pool at a substantially constant head through said mat, automatically measuring the rate of flow of said liquid, removing the mat from the pool, and eliminating variations in the viscosity of such liquid arising from changes in the temperature thereof.

51. Process of ascertaining the slowness of aqueous pulp, which comprises maintaining a substantially constant concentration of such pulp in a pool, continuously forming the solid component of such pulp in a moving mat, causing the liquid conponent to flow from said pool through said mat into a column of such liquid, causing the liquid in such column to flow through a restricted outlet, and indicating the rate of flow of said liquid to said column by noting variations in the level of such column, thereby indicating variations in the slowness or freeness of the pulp.

52. A process of ascertaining the slowness of aqueous pulp, which comprises simultaneously continuously forming a layer of the solid component thereof on a travelling screen and continuously causing the liquid component to flow therethrough, and simultaneously indicating variations in the thickness of such layer after the formation thereof and in the rate of flow of such liquid component in terms of the reciprocal of the product of the multiplication of such thickness by such rate of flow.

53. A process of ascertaining the slowness of aqueous pulp, which comprises forming and maintaining a pool of such aqueous pulp at a substantially constant level, causing the solid component thereof to form in a mat on a travelling screen and the liquid component to flow through such mat, and simultaneously indicating variations in the thickness of such layer after the formation thereof and in the rate of flow of such liquid component in terms of the reciprocal of the product of the multiplication of such thickness by such rate of flow.

54. A method of ascertaining the slowness of cellulosic material, which comprises continuously forming into a mat the cellulosic component of an aqueous pulp and passing the liquid through the mat, and simultaneously indicating variations in the thickness of such mat after its formation and the rate of flow of such liquid in terms of the reciprocal of the product of the multiplication of such thickness by such rate of flow.

55. A process of ascertaining the slowness of aqueous pulp, which comprises forming a layer of the solid component thereof on a moving cylinder mold partially immersed in a body of such aqueous pulp, and noting the quantity of such component in such layer on said cylinder mold.

56. A process of ascertaining the slowness of aqueous pulp, which comprises continuously forming a layer of the solid component into a moving mat during constant predetermined successive intervals of time and simultaneously causing the liquid component to pass therethrough, and noting variations in the rate of flow of the liquid through the mat in such successive time intervals.

57. A process of ascertaining the slowness of aqueous pulp, which comprises continuously forming a lawer of the solid component into a moving mat during constant predetermined successive intervals of time and simultaneously causing the liquid component to pass therethrough, and indicating variations in the quantities of said solid formed into said mat and the rate of flow of liquid therethrough during said successive time intervals.

58. A method such as herein described, comprising beating a suspension of fibrous material, substantially continuously measuring the slowness of the beaten material, and automatically and intermittently varying the beating of said suspension with intervening time intervals between the variations, when the slowness of the beaten stock changes from a predetermined standard.

59. A process of ascertaining the slowness of aqueous pulp, which comprises continuously forming a layer of the solid component upon a travelling screen, and noting the variations in such layer on said screen.

60. A process of ascertaining the slowness of aqueous pulp, which comprises continuously forming a lawer of the solid component upon a travelling screen while maintaining a substantially constant concentration of the body of such aqueous pulp, and noting variations in such layer on said screen.

61. Mechanism for ascertaining the characteristics of a solid suspended in a liquid, comprising means for containing the suspension, means for forming the solid thereof into a layer, means for causing the liquid of the suspension to flow through the layer, means for removing the layer from the liquid, and automatic means for indicating the thickness of such layer immediately after its removal.

62. Mechanism for ascertaining the characteristics of a solid suspended in a liquid, comprising means for containing the suspension, means for forming the solid thereof into a layer and removing it from the suspension, means for causing the liquid of the suspension to flow through the layer before its removal from the suspension, and means for automatically indicating the resistance of such layer to the passage of the liquid therethrough.

63. Mechanism for ascertaining the characteristics of a solid suspended in a liquid, comprising means for containing the suspension, means for continuously forming the solid thereof into a layer and removing it from the suspension, means for causing the liquid of the suspension to flow through the layer before its removal from the suspension, and means for indicating the rate of the flow of the liquid through such layer.

64. Mechanism for ascertaining the characteristics of a solid suspended in a liquid, comprising means for containing the suspension, means for forming the solid thereof into a layer and removing it from the suspension, means for causing the liquid of the suspension to flow through the layer before removal from the suspension, and means for indicating the thickness of such layer after such removal and the rate of flow of the liquid therethrough.

65. Mechanism for ascertaining the characteristics of a solid suspended in a liquid, comprising means for containing the suspension, a screen adapted to travel through said suspension, means for causing the solid of the suspension to form a layer on said screen and the liquid of said suspension to flow therethrough, and means for automatically indicating the thickness of said formed layer on said screen.

66. Mechanism for ascertaining the characteristics of a solid suspended in a liquid, comprising means for containing the suspension, a screen adapted to travel through said suspension, means for causing the solid of the suspension to form a layer on said screen and the liquid of said suspension to flow therethrough, and means for automatically indicating the rate of the flow of liquid through said forming layer.

67. Mechanism for ascertaining the characteristics of a solid suspended in a liquid, comprising means for containing the suspension, a screen adapted to travel through said suspension, means for causing the solid of the suspension to form a layer on said screen and the liquid of said suspension to flow therethrough, and means for automatically indicating the resistance to the flow of liquid through such forming layer.

68. Mechanism for ascertaining the characteristics of a solid suspended in a liquid, comprising means for containing the suspension, a screen adapted to travel through said suspension, means for causing the solid of the suspension to form a layer on said screen and the liquid of said suspension to flow therethrough, and means for automatically measuring the thickness of said layer and the rate of the flow of the water therethrough.

69. Mechanism for ascertaining the characteristics of a solid suspended in a liquid, comprising means for containing the suspension, a screen adapted to travel through said suspension, means for causing the solid of the suspension to form a layer on said screen and the liquid of said suspension to flow therethrough, and an indicator automatically controlled by the thickness of said layer on said screen.

70. Mechanism for ascertaining the characteristics of a solid suspended in a liquid, comprising means for containing the suspension, a screen adapted to travel through said suspension, means for causing the solid of the suspension to form a layer on said screen and the liquid of said suspension to flow therethrough, an indicator, and means controlled by the rate of flow of the liquid through said layer for controlling the indicator.

71. Mechanism for acertaining the characteristics of a solid suspended in a liquid, comprising means for containing the suspension, a screen adapted to travel through said suspension, means for causing the solid of the suspension to form a layer on said screen and the liquid of said suspension to flow therethrough, an indicator having associated indicating devices, means by which one of said devices is controlled by the thickness of said layers, and means by which the other of said devices is controlled by the rate of the flow of the liquid.

72. Mechanism for ascertaining the characteristics of a solid suspended in a liquid, comprising means for containing the suspension, a screen adapted to travel through said suspension, means for causing the solid of the suspension to form a layer on said screen and the liquid of said suspension to flow therethrough, an indicator comprising a dial having a scale and an associated index, each movable relatively to the other, means by which one of the last mentioned members is movably responsive to variations in the thickness of said layer, and means by which the other member is movably responsive to variations in the rate of flow of the liquid.

73. Mechanism for ascertaining the characteristics of a solid suspended in a liquid, comprising a vat for containing the suspension, a rotary screen partially immersed in the suspension in the vat, on which the solid forms a layer and through which the water flows, means for rotating the screen, and means for automatically measuring the formed layer thereon.

74. Mechanism for ascertaining the charcateristics of a solid suspended in a liquid, comprising a vat for containing the suspension, a rotary screen partially immersed in the suspension in the vat, on which the solid forms a layer and through which the water flows, means for rotating the screen, and a measuring device responsive to variations in the thickness of the formed layer on the screen.

75. Mechanism for ascertaining the characteristics of a solid suspended in a liquid, comprising a vat for containing the suspension, a rotary screen partially immersed in the suspension in the vat, on which the solid forms a layer and through which the water flows, means for rotating the screen, means for measuring the thickness of the layer formed on the screen, and a meter for measuring the rate of flow of water through said layer.

76. Mechanism for ascertaining the characteristics of a solid suspended in a liquid, comprising a vat for containing the suspension, a rotary screen partially immersed in the suspension in the vat, on which the solid forms a layer and through which the water flows, a meter for measuring the rate of flow of water through the forming layer, means for measuring the thickness of the layer formed on the screen, and indicating mechanism controlled by said measuring means and said meter.

77. Mechanism for ascertaining the characteristics of a solid suspended in a liquid, comprising a vat for containing the suspension, a rotary screen partially immersed in the suspension in the vat on which the solid forms a layer and through which the water flows, means for rotating the screen, means within the screen forming separated chambers about which the screen rotates, one of said chambers being below and the other above the level of the suspension in the vat, and means for creating a balanced suction in said chambers.

78. Mechanism for ascertaining the characteristics of a solid suspended in a liquid, comprising a vat for containing the suspension, a rotary screen partially immersed in the suspension in the vat on which the solid forms a layer and through which the water flows, means for rotating the screen, means within the screen forming separated chambers about which the screen rotates, one of said chambers being below and the other above the level of the suspension in the vat, means for withdrawing air from the upper chamber, and means for withdrawing liquid through lower chamber.

79. Mechanism for ascertaining the characteristics of a solid suspended in a liquid, comprising a vat for containing the suspension, a rotary screen partially immersed in the suspension in the vat on which the solid forms a layer and through which the water flows, means for rotating the screen, means within the screen forming separated chambers about which the screen rotates, one of said chambers being below and the other above the level of the suspension in the vat, means for withdrawing air from the upper chamber, means for withdrawing liquid through lower chamber, and means for measuring the rate of flow of liquid from the lower chamber.

80. Mechanism for ascertaining the characteristics of a solid suspended in a liquid, comprising a vat for containing the suspension, a rotary screen partially immersed in the suspension in the vat on which the solid forms a layer and through which the water flows, means for rotating the screen, means within the screen forming separated chambers about which the screen rotates, one of said chambers being below and the other above the level of the suspension in the vat, means for withdrawing air from the upper chamber, means for withdrawing liquid through lower chamber, and means for measuring the thickness of the layer on that part of the screen which is passing over the upper chamber.

81. Mechanism for ascertaining the characteristics of a solid suspended in a liquid, comprising a vat for containing the suspension, a rotary screen partially immersed in the suspension in the vat on which the solid forms a layer and through which the water flows, means for rotating the screen, means within the screen forming separated chambers about which the screen rotates, one of said chambers being below and the other above the level of the suspension in the vat, means for withdrawing air from the upper chamber, means for withdrawing liquid through lower chamber, means for measuring the thickness of the layer on that part of the screen which is passing over the upper chamber, and means for indicating the measured thickness.

82. Mechanism for ascertaining certain characteristics of a solid suspended in a liquid, comprising a vat for said suspension, a rotary screen partially immersed in said suspension for the formation of a layer of said solid thereon and the flow of liquid therethrough, an apron of flexible, substantially non-compressible material travelling in contact with said layer on the screen, and a device responsive to variations in thickness of said layer engaging said apron in the zone of its contact with said layer.

83. Mechanism for ascertaining certain characteristics of a solid suspended in a liquid, consisting of web-forming mechanism comprising a vat for the suspension, a cylinder mold operating therein, and means for automatically measuring the thickness of the formed web or mat on said cylinder mold.

84. Mechanism for ascertaining certain characteristics of a solid suspended in a liquid, comprising web-forming mechanism including a vat for the suspension and a cylinder mold operating therein, means for maintaining a substantially constant concentration of said suspension and a substantially constant level of said suspension in said vat, and means for automatically measuring the thickness of the formed web or mat on said cylinder.

85. Mechanism for ascertaining certain characteristics of a solid suspended in a liquid, comprising web-forming mechanism including a vat for the suspension and a cylinder mold operating therein, means for maintaining a substantially constant concentration of said suspension and a substantially constant level of said suspension in said vat, and means for automatically measuring the rate of flow of liquid through said cylinder mold.

86. Mechanism for ascertaining certain characteristics of a solid suspended in a liquid, comprising a vat for said suspension, a web-forming cylinder mold therein, an apron contacting with the web formed on said cylinder mold, a movable measuring device engaging said apron in its zone of contact with the web, and an indicator responsive to variations in position of said measuring device.

87. Mechanism for ascertaining certain characteristics of a solid suspended in a liquid, comprising a vat for said suspension, a web-forming cylinder mold therein, an apron contacting with the web formed on said cylinder mold, a movable measuring device engaging said apron in its zone of contact with the web, and a recording mechanism responsive to variations in position of said measuring device.

88. Mechanism for ascertaining certain characteristics of a solid suspended in a liquid, comprising a vat for said suspension, a web-forming cylinder mold operating therein, a measuring roll responsive to variations in the thickness of the formed web on the cylinder mold, and an indicating device responsive to variations in the position of the roll.

89. Mechanism for ascertaining the characteristics of a solid suspended in a liquid, comprising a vat, a web-forming cylinder mold operating therein, a measuring device responsive to variations in thickness of the web formed on said cylinder mold, a device for measuring the rate of flow of liquid through said layer and said cylinder mold, and indicating means controlled by said measuring devices whereby the thickness of said web and the rate of flow of said liquid are indicated.

90. Mechanism for ascertaining the characteristics of a solid suspended in a liquid, comprising a vat, a web-forming cylinder mold operating therein, a measuring device responsive to variations in thickness of the web formed on said cylinder mold, a device for measuring the rate of flow of liquid through said layer and said cylinder mold, and means controlled by the said web measuring devices for delivering said suspension to said vat.

91. Mechanism for ascertaining the characteristics of a solid suspended in a liquid, comprising a vat, a web-forming cylinder mold operating therein, a measuring device responsive to variations in thickness of the web formed on said cylinder mold, a device for measuring the rate of flow of liquid through said layer and said cylinder mold, and means responsive to variations in position of said measuring device, responsive to variations in the rate of flow of liquid through said web and cylinder mold, and responsive to variations in the level of the suspension in said vat for automatically maintaining a substantially constant ratio of solid to liquid in said vat.

92. In a testing device, a vat for a solid suspended in a liquid, a rotary web-forming cylinder mold comprising a relatively thin cylindrical wall having narrow parallel longitudinal outwardly diverging slits in said wall and having the partitions between said slits closely spaced and terminating outwardly in knife edges, and a wire screen on the cylindrical portion of said shell and resting against said knife edges.

93. In a testing device, a vat for a solid suspended in a liquid, a rotary web-forming cylinder mold comprising a shell, a wire screen enwrapped about the cylindrical portion of said shell in combination with a substantially horizontal stationary plug within said shell dividing the interior of said shell into upper and lower non-communicating chambers, and means for mounting said cylinder mold with the axis of said plug at the level of the liquid in said vat.

94. In a testing device, a vat for a solid suspended in a liquid, a rotary web-forming cylinder mold comprising a shell, and a strip of wire screen wound helically upon said shell with the edges of successive convolutions abutting.

95. In a testing device, a vat for a solid suspended in a liquid, a rotary web-forming cylinder mold comprising a shell, a wire screen enwrapped about the cylindrical portion of said shell in combination with a stationary plug within said shell dividing the interior of said shell into upper and lower non-communicating chambers, and means for maintaining the level of the suspension in said vat above the lower chamber and below the upper chamber.

96. In a testing device, a vat for a solid suspended in a liquid, a rotary web-forming cylinder mold comprising a shell, a wire screen enwrapped about the cylindrical portion of said shell in combination with a stationary plug within said shell dividing the interior of said shell into upper and lower non-communicating chambers, means for maintaining the level of the suspension in said vat above the lower chamber and below the upper chamber, and means for creating a suction in each of said chambers.

97. In a testing device, a vat for a solid suspended in a liquid, a rotary web-forming cylinder mold comprising a shell, a wire screen enwrapped about the cylindrical portion of said shell in combination with a stationary plug within said shell dividing the interior of said shell into upper and lower non-communicating chambers, means for maintaining the level of the suspension in said vat above the lower chamber and below the upper chamber, and means for creating a balanced suction in said chambers.

98. In a testing device, a vat for a solid suspended in a liquid, a rotary web-forming cylinder mold comprising a shell, a wire screen enwrapped about the cylindrical portion of said shell in combination with a stationary plug within said shell dividing the interior of said shell into upper and lower non-communicating chambers, means for maintaining the level of the suspension in said vat above the lower chamber and below the upper chamber, and means for withdrawing air from the upper chamber and for withdrawing water from the lower chamber.

99. In a testing machine, a vat for a solid suspended in a liquid, a rotary web-forming cylinder mold, a plug in said mold dividing the interior thereof into upper and lower non-communicating chambers, means for conducting liquid from the lower of said chambers, means for maintaining the level of the suspension in the vat above the lower chamber, and means for measuring the rate of flow of liquid conducted from said lower chamber.

100. In a testing machine, a vat for a solid suspended in a liquid, a rotary web-forming cylinder mold, a plug in said mold dividing the interior thereof into upper and lower non-communicating chambers, means for conducting liquid from the lower of said chambers, means for maintaining the level of the suspension in the vat above the lower chamber, and a measuring device responsive to variations in the thickness of the web on the cylinder mold above the upper chamber.

101. In a testing machine, a vat for a solid suspended in a liquid, a rotary web-forming cylinder mold, a plug in said mold dividing the interior thereof into upper and lower non-communicating chambers, means for conducting liquid from the lower of said chambers, means for maintaining the level of the suspension in the vat above the lower chamber, a measuring device responsive to variations in the thickness of the web on the cylinder mold above the upper chamber, and a measuring device responsive to variations in the rate of flow of liquid from said lower chamber.

102. In a testing machine, a vat, a web-forming cylinder operating therein, a movable frame having guide rolls, an apron tracking on said guide rolls and resting on the web formed on the cylinder mold, and a device responsive to variations in the thickness of the web engaging that zone of the apron which bears against said web.

103. In a testing machine, a vat, a web-forming cylinder operating therein, and an endless, flexible, non-corrosive, substantially non-compressible apron arranged to engage the web formed on said cylinder mold.

104. Mechanism for determining the characteristics of a solid suspended in a liquid, comprising a vat for the liquid suspension, a web-forming cylinder mold operating therein, a flexible apron for engagement with the web on the cylinder mold, and a measuring roll engaging said apron and responsive to variations in the thickness of the web.

105. Mechanism for determining the characteristics of a solid suspended in a liquid, comprising a vat for the liquid suspension, a web-forming cylinder mold operating therein, a flexible apron for engagement with the web on the cylinder mold, a measuring roll engaging said apron and responsive to variations in the thickness of the web, and a movable frame having guide rolls for said apron.

106. Mechanism for determining the characteristics of a solid suspended in a liquid, comprising a vat for the liquid suspension, a web-forming cylinder mold operating therein, a flexible apron for engagement with the web on the cylinder mold, a measuring roll engaging said apron and responsive to variations in the thickness of the web, guide rolls for said apron, and means for cleaning said apron.

107. Mechanism for determining the characteristics of a solid suspended in a liquid, comprising a vat for the liquid suspension, a web-forming cylinder mold operating therein, a flexible apron for engagement with the web on the cylinder mold, a measuring roll engaging said apron and responsive to variations in the thickness of the web, and means for effecting the removal of said web from said cylinder mold after it passes said apron.

108. Mechanism for determining the characteristics of a solid suspended in a liquid, comprising a vat for the liquid suspension, a web-forming cylinder mold operating therein, a flexible apron for engagement with the web on the cylinder mold, a measuring roll engaging said apron and responsive to variations in the thickness of the web, and means for supplying liquid to effect the removal of the web from the cylinder mold after it passes said apron.

109. Mechanism for determining the characteristics of a solid suspended in a liquid, comprising a vat for the liquid suspension, a web-forming cylinder mold operating therein, a measuring device responsive to variations in the thickness of the formed web on the cylinder mold, and means for effecting the removal of said web from the cylinder mold.

110. Mechanism for determining the characteristics of a solid suspended in a liquid, comprising a vat for the liquid suspension, a web-forming cylinder mold operating therein, a measuring device responsive to variations in the thickness of the web on the cylinder mold, and means for supplying liquid to effect the removal of said web from the cylinder mold.

111. Mechanism for determining the characteristics of a solid suspended in a liquid, comprising a vat for the liquid suspension, a web-forming cylinder mold operating therein, a measuring device responsive to variations in the thickness of the web on the cylinder mold, and a doctor associated with said cylinder mold.

112. Mechanism for determining the characteristics of a solid suspended in a liquid, comprising a vat for the liquid suspension, a web-forming cylinder mold operating therein, a measuring device responsive to variations in the thickness of the web on the cylinder mold, a doctor associated with said cylinder mold, and means for yieldingly supporting said doctor.

113. Mechanism for determining the characteristics of a solid suspended in a liquid, comprising a vat for the liquid suspension, a web-forming cylinder mold operating therein, a measuring device responsive to variations in the thickness of the web on the cylinder mold, a doctor associated with said cylinder mold, and means for delivering liquid from the interior of the cylinder mold against the web formed thereon in juxtarelation to said doctor.

114. Mechanism for determining the characteristics of a solid suspended in a liquid, comprising a vat for the liquid suspension, a web-forming cylinder mold operating therein, a measuring device responsive to variations in the thickness of the web on the cylinder mold, and means for supplying liquid interiorly and exteriorly of the cylinder mold to effect the removal of the web therefrom.

115. Mechanism for determining the characteristics of a solid suspended in a liquid, comprising a vat for the liquid suspension, a web-forming cylinder mold operating therein, a measuring device responsive to variations in the thickness of the web on the cylinder mold, and a doctor associated with the cylinder mold to receive the web therefrom and arranged to deliver the solid material outside the vat.

116. Mechanism for determining the characteristics of a solid suspended in a liquid, comprising a vat for the liquid suspension, a web-forming cylinder mold operating therein and permitting the outflow of water passing through the web, and a measuring device responsive to variations in the rate of outflow of such water.

117. Mechanism for determining the characteristics of a solid suspended in a liquid, comprising a vat for the liquid suspension, a web-forming cylinder mold operating therein and permitting the outflow of water passing through the web, a measuring device responsive to variations in the rate of outflow of such water, and means for maintaining a substantially constant level of the suspension in said vat.

118. Mechanism for determining the characteristics of a solid suspended in a liquid, comprising a vat for the liquid suspension, a web-forming cylinder mold operating therein and permitting the outflow of water passing through the web, a measuring device responsive to variations in the rate of outflow of such water, and means for maintaining a substantially constant ratio of solid to liquid in the said suspension vat.

119. Mechanism for determining the characteristics of a solid suspended in a liquid, comprising a vat for the liquid suspension, a web-forming cylinder mold operating therein and permitting the outflow of water passing through the web, a measuring device responsive to variations in the rate of outflow of such water, means for maintaining a substantially constant level of the suspension in said vat, and means for maintaining a substantially constant ratio of solid to liquid in said suspension.

120. Mechanism for ascertaining the characteristics of a solid suspended in a liquid, comprising a vat for the suspension, a web-forming cylinder mold operating therein, an upright tank for receiving the liquid delivered from the cylinder mold and having a reduced outlet whereby the level of the liquid therein varies with the rate of flow of said liquid delivered by the cylinder mold, and means by which the level of said liquid is ascertainable.

121. Mechanism for ascertaining the characteristics of a solid suspended in a liquid, comprising a vat for the suspension, a web-forming cylinder mold operating therein, an upright tank for receiving the liquid delivered from the cylinder mold and having a reduced outlet whereby the level of the liquid therein varies with the rate of flow of said liquid delivered by the cylinder mold, said outlet consisting of capillaries to compensate for variations in the viscosity of said liquid due to temperature fluctuations, and means by which the said level of the liquid is ascertainable.

122. Mechanism for ascertaining the characteristics of a solid suspended in a liquid, comprising a vat for the suspension, a web-forming cylinder mold operating therein, an upright tank for receiving the liquid delivered from the cylinder mold and having a reduced outlet whereby the level of the liquid therein varies with the rate of flow of said liquid delivered by the cylinder mold, a float in said tank, and an indicator responsive to variations in position of said float.

123. Mechanism for ascertaining the characteristics of a solid suspended in a liquid, comprising a vat for the suspension, a web-forming cylinder mold operating therein, an upright tank for receiving the liquid delivered from the cylinder mold and having a reduced outlet whereby the level of the liquid therein varies with the rate of flow of said liquid delivered by the cylinder mold, a float in said tank, and a recording mechanism responsive to variations in position of said float.

124. Mechanism for ascertaining the characteristics of a solid suspended in a liquid, comprising a vat for the suspension, a web-forming cylinder mold operating therein, an upright tank for receiving the liquid delivered from the cylinder mold and having a reduced outlet whereby the level of the liquid therein varies with the rate of flow of said liquid delivered by the cylinder mold, a float in said tank, an indicator responsive to variations in position of said float, and means for automatically maintaining a substantially constant level of said suspension in said vat.

125. Mechanism for ascertaining the characteristics of a solid suspended in a liquid, comprising a vat for the suspension, a web-forming cylinder mold operating therein, an upright tank for receiving the liquid delivered from the cylinder mold and having a reduced outlet whereby the level of the liquid therein varies with the rate of flow of said liquid delivered by the cylinder mold, a float in said tank, an indicator responsive to variations in position of said float, and means for automatically maintaining a substantially uniform ratio of solid to liquid in the suspension in the vat.

126. Mechanism for ascertaining the characteristics of a solid suspended in a liquid, comprising a vat for the suspension, a web-forming cylinder mold operating therein, an upright tank for receiving the liquid delivered from the cylinder mold and having a reduced outlet whereby the level of the liquid therein varies with the rate of flow of said liquid delivered by the cylinder mold, a float in said tank, an indicator responsive to variations in position of said float, means for automatically maintaining a substantially uniform ratio of solid to liquid in the suspension in the vat, and means for automatically maintaining a substantially constant level of said suspension in said vat.

127. Mechanism for ascertaining the characteristics of a solid suspended in a liquid, comprising a vat for the suspension, a web-forming cylinder mold operating therein, an upright tank for receiving the liquid delivered from the cylinder mold and having a reduced outlet whereby the level of the liquid therein varies with the rate of flow of said liquid delivered by the cylinder mold, said outlet consisting of capillaries and automatic means for reversing the flow of said liquid through said capillaries.

128. Mechanism for determining the characteristics of a solid suspended in a liquid, comprising a vat for the suspension, a web-forming cylinder mold operating therein, a measuring device for measuring the thickness of the web formed thereon, a measuring device for measuring the rate of outflow of the liquid from the cylinder mold, and indicators controlled automatically by said measuring devices respectively.

129. Mechanism for determining the characteristics of a solid suspended in a liquid, comprising a vat for the suspension, a web-forming cylinder mold operating therein, a measuring device for measuring the thickness of the web formed thereon, a measuring device for measuring the rate of outflow of the liquid from the cylinder mold, and an indicating mechanism including a scale dial and an associated index, one controlled by one of said measuring devices and the other controlled by the other measuring device.

130. Mechanism for determining the characteristics of a solid suspended in a liquid, comprising a vat for the suspension, a web-forming cylinder mold operating therein, a measuring device for measuring the thickness of the web formed thereon, a measuring device for measuring the rate of outflow of the liquid from the cylinder mold, independent members responsive to said measuring devices respectively, a scale dial moved by one of said members, and an index associated therewith moved by the other member.

131. Mechanism for determining the characteristics of a solid suspended in a liquid, comprising a vat for the suspension, a web-forming cylinder mold operating therein, a measuring device for measuring the thickness of the web formed thereon, a measuring device for measuring the rate of outflow of the liquid from the cylinder mold, independent members responsive to said measuring devices, a movable dial having a logarithmic scale and a movable associated index, and logarithmic cams respectively operating said dial and index and independently operated by said respective members.

132. Mechanism for determining the characteristics of a solid suspended in a liquid, comprising a vat for the suspension, a web-forming cylinder mold operating therein, a measuring device for measuring the thickness of the web formed thereon, a measuring device for measuring the rate of outflow of the liquid from the cylinder mold, and an indicating mechanism responsive to both said measuring devices and indicating the product of the rate of flow of said liquid multiplied by the thickness of said web.

133. Mechanism for determining the characteristics of a solid suspended in a liquid, comprising a vat for the suspension, a web-forming cylinder mold operating therein, a measuring device for measuring the thickness of the web formed thereon, an indicator, power mechanism for moving said indicator, and means by which said power mechanism is automatically controlled by said measuring device.

134. Mechanism for determining the characteristics of a solid suspended in a liquid, comprising a vat for the suspension, a web-forming cylinder mold operating therein, a measuring device for measuring the thickness of the web formed thereon, an indicator, an electric motor for moving said indicator in opposite directions, and means actuated by said measuring device for automatically controlling said motor to cause the indicator to move responsive to variations in position of said measuring device but to a proportionally greater extent.

135. Mechanism for determining the characteristics of a solid suspended in a liquid, comprising a vat for the suspension, a web-forming cylinder mold operating therein, a measuring device for measuring the thickness of the web formed thereon, an indicator, a reversible electric motor for moving said indicator in opposite directions, and switch mechanism for controlling the electric motor in turn controlled by said measuring device.

136. Mechanism of the character described, comprising a vat for a liquid suspension, a web-forming cylinder mold therein, a measuring device responsive to variations in the rate of flow of liquid from the cylinder mold, and an indicator controlled by said measuring device.

137. Mechanism of the character described, comprising a vat for a liquid suspension, a web-forming cylinder mold therein, a measuring device responsive to variations in the rate of flow of liquid from the cylinder mold, a slide, a screw controlled by said measuring device for moving said slide, and indicating means controlled by said slide.

138. Mechansim of the character described, comprising a vat for a liquid suspension, a web-forming cylinder mold therein, a measuring device responsive to variations in the rate of flow of liquid from the cylinder mold, a measuring device responsive to variations in the thickness of the web formed on the cylinder mold, parallel screw bars controlled by said measuring devices respectively, cam pushers operated by the screw bars, and logarithmic cams respectively operated by said pushers, one having an indicating device and the other having an indicating device associated with the first mentioned indicating device.

139. Mechanism of the character described, comprising a vat for a liquid suspension, a web-forming cylinder mold therein, a measuring device responsive to variations in the rate of flow of liquid from the cylinder mold, a measuring device responsive to variations in the thickness of the web formed on the cylinder mold, parallel screw bars controlled by said measuring devices respectively, cam pushers operated by the screw bars, and logarithmic cams respectively operated by said pushers and movable about the same axis, one provided with a dial affixed thereto and the other having an index affixed thereto.

140. Mechanism of the character described, comprising a vat for a liquid suspension, a cylinder mold operating therein, a device responsive to variations in the thickness of the formed web on the cylinder mold, and means for supplying said suspension to said vat controlled by said device.

141. Mechanism of the character described, comprising a vat for a liquid suspension, a cylinder mold operating therein, a device responsive to variations in the thickness of the web formed on the cylinder mold, a device responsive to variations in the rate of flow of liquid from said cylinder mold, a valve for supplying said suspension to said vat, and means in consequence of which said valve is controlled in operation by both said devices.

142. Mechanism of the character described, comprising a vat for a liquid suspension, a cylinder mold operating therein, a device responsive to variations in the thickness of the web formed on the cylinder mold, a device responsive to variations in the rate of flow of liquid from said cylinder mold, a valve for supplying said suspension to said vat, means in consequence of which said valve is controlled in operation by both said devices, and float-controlled means for supplying only liquid to the suspension in the vat.

143. Mechanism of the character described, comprising a vat for a liquid suspension, a cylinder mold operating therein, a device responsive to variations in the thickness of the web formed on the cylinder mold, a device responsive to variations in the rate of flow of liquid from said cylinder mold, a valve for supplying said suspension to said vat, means in consequence of which said valve is controlled in operation by both said devices, float-controlled means for supplying only liquid to the suspension in the vat, and an overflow in said vat for regulating the level of the suspension therein.

144. Mechanism of the character described, comprising a beating engine having a rotor for beating a pulp suspension, and means automatically controlled by the slowness of the pulp for automatically regulating the operation of the beating engine.

145. Mechanism of the character described, comprising a beating engine having a rotor for beating a pulp suspension, and means responsive to variations in the resistance by a mat of such beaten pulp to the flow of liquid therethrough for automatically controlling the operation of said beating engine.

146. Mechanism of the character described, comprising a beating engine having a rotor for beating a pulp suspension, and means responsive to variations in the resistance of a mat of such beaten pulp to the flow of liquid therethrough for automatically adjusting said rotor to vary the intensity of the beating operation.

147. Mechanism of the character described, comprising a beating engine having a rotor for beating a pulp suspension, and means responsive to variations in the resistance of a mat of such beaten pulp to the flow of liquid therethrough for automatically and periodically adjusting said rotor to vary the intensity of the beating operation.

148. Mechanism of the character described, comprising a beating engine having a rotor for beating a pulp suspension, means for measuring the resistance to the passage of the liquid through a mat as it is being formed of the pulp of such suspension, and mechanism responsive to said measuring means for automatically controlling the operation of said beating engine.

149. Mechanism of the character described, comprising a beating engine having an adjustable rotor, a vat for receiving the beaten pulp, a web-forming cylinder mold operating in said vat, a device responsive to variations in the thickness of the web formed on the cylinder mold, and mechanism automatically controlled by said device for automatically controlling the operation of said rotor.

150. Mechanism of the character described, comprising a beating engine having an adjustable rotor, a vat for receiving the beaten pulp, a web-forming cylinder mold operating in said vat, a device responsive to variations in the rate of outflow of liquid from said cylinder mold, and mechanism automatically controlled by said device for automatically controlling the operation of said rotor.

151. Mechanism of the character described, comprising a beating engine having an adjustable rotor, a vat for receiving the beaten pulp, a web-forming cylinder mold operating in said vat, a device responsive to variations in the rate of outflow of liquid from said cylinder mold, a device responsive to variations in the thickness of the web formed on the cylinder mold, and automatic mechanism automatically controlled by said devices for controlling the operation of said rotor.

152. Mechanism of the character described, comprising a beating engine having an adjustable rotor, a vat for receiving the beaten pulp, a web-forming cylinder mold operating in said vat, a device responsive to variations in the rate of outflow of liquid from said cylinder mold, a motor for adjusting said rotor to vary the intensity of the beating operation, and mechanism responsive to said device for controlling the adjustment of said rotor.

153. Mechanism of the character described, comprising a beating engine having an adjustable rotor, a vat for receiving the beaten pulp, a web-forming cylinder mold operating in said vat, a device responsive to variations in the thickness of the web formed on the cylinder mold, a motor for adjusting said rotor to vary the intensity of the beating operation, and mechanism responsive to said device for controlling the adjustment of said rotor.

154. Mechanism of the character described, comprising a beating engine having an adjustable rotor, a vat for receiving the beaten pulp, a web-forming cylinder mold operating in said vat, a device responsive to variations in the rate of outflow of liquid from said cylinder mold, a device responsive to variations in the thickness of the web formed on the cylinder mold, a motor for adjusting said rotor to vary the intensity of the beating operation, and mechanism responsive to said devices jointly for controlling the adjustment of said rotor.

155. Mechanism of the character described, comprising a vat for a pulp suspension, a web-forming cylinder mold therein, a device responsive to variations in the thickness of the web formed on said cylinder mold, an operating electric circuit, and means controlled by said device for varying the potential in said circuit.

156. Mechanism of the character described, comprising a vat for a pulp suspension, a web-forming cylinder mold therein, a device responsive to variations in the rate of outflow of liquid from said cylinder mold, an operating electric circuit, and means controlled by said device for varying the potential in said circuit.

157. Mechanism of the character described, comprising a vat for a pulp suspension, a web-forming cylinder mold therein, a device responsive to variations in the rate of outflow of liquid from said cylinder mold, a device responsive to variations in the thickness of the web formed on said cylinder mold, an operating circuit, and means controlled jointly by said devices for varying the potential of said circuit.

158. Mechanism of the character described, comprising a vat for a pulp suspension, a web-forming cylinder mold therein, a device responsive to variations in the thickness of the web formed on said cylinder mold, an operating electric circuit, means controlled by said device for varying the potential in said circuit, and a recording mechanism in operative relation to said circuit.

159. Mechanism of the character described, comprising a vat for a pulp suspension, a web-forming cylinder mold therein, a device responsive to variations in the rate of outflow of liquid from said cylinder mold, an operating electric circuit, means controlled by said device for varying the potential in said circuit, and a recording mechanism in operative relation to said circuit.

160. Mechanism of the character described, comprising a vat for a pulp suspension, a web-forming cylinder mold therein, a device responsive to variations in the rate of outflow of liquid from said cylinder mold, a device responsive to variations in the thickness of the web formed on said cylinder mold, an operating circuit, means controlled jointly by said devices for varying the potential of said circuit, and a recording mechanism in operative relation to said circuit.

161. Mechanism of the character described, comprising a vat for a pulp suspension, a web-forming cylinder mold therein, a device responsive to variations in the thickness of the web formed on said cylinder mold, an operating electric circuit, means controlled by said device for varying the potential in said circuit, a beater from which pulp suspension is delivered to said vat, and mechanism responsive to variations in potential in said circuit for controlling the operation of said beater.

162. Mechanism of the character described, comprising a vat for a pulp suspension, a web-forming cylinder mold therein, a device responsive to variations in the rate of outflow of liquid from said cylinder mold, an operating electric circuit, means controlled by said device for varying the potential in said circuit, a beater from which pulp suspension is delivered to said vat, and mechanism responsive to variations in potential in said circuit for controlling the operation of said beater.

163. Mechanism of the character described, comprising a vat for a pulp suspension, a web-forming cylinder mold therein, a device responsive to variations in the rate of outflow of liquid from said cylinder mold, a device responsive to variations in the thickness of the web formed on said cylinder mold, an operating circuit, means controlled jointly by said devices for varying the potential of said circuit, a beater from which pulp suspension is delivered to said vat, and mechanism responsive to variations in potential in said circuit for controlling the operation of said beater.

164. A machine such as herein described, comprising a vat, and a cylinder mold therein, said cylinder mold being provided with a supporting shell and a screen supported thereby and wound helically thereabout with the edges of its convolutions abutting one another, whereby the operative peripheral surface of said mold is free from protuberances.

165. A machine such as herein described, comprising a vat, a cylinder mold operating therein and adapted to form a layer of pulp thereon, an apron engaging the mat formed on said cylinder mold, a measuring device for engaging said apron in its zone of contact with said mat, and means in consequence of which said mat is prevented from adhering to and following said apron.

166. A mechanism such as herein described, comprising a travelling support for a mass of compressible material, a substantially non-compressible endless apron arranged to engage a relatively large area of said layer during a portion of its travel, and a measuring device engaging said apron in its zone of contact with said mass of material.

167. Mechanism of the character described, comprising a beating engine having an adjustable rotor, a vat for receiving the beaten pulp, a web-forming cylinder mold operating in said vat, a device responsive to variations in the rate of outflow of liquid from said cylinder mold, a motor for adjusting said rotor to vary the intensity of the beating operation, mechanism responsive to said device for controlling the adjustment of said rotor, and means for automatically limiting the adjustment of said rotor.

168. Mechanism of the character described, comprising a beating engine having an adjustable rotor, a vat for receiving the beaten pulp, a web-forming cylinder mold operating in said vat, a device responsive to variations in the thickness of the web formed on the cylinder mold, a motor for adjusting said rotor to vary the intensity of the beating operation, mechanism responsive to said device for controlling the adjustment of said rotor, and means for automatically limiting the adjustment of said rotor.

169. A process of ascertaining the slowness of aqueous pulp, which comprises simultaneously continuously forming a layer of the solid component thereof on a travelling screen and causing the liquid component to flow therethrough, and simultaneously recording variations in the thickness of said layer and in the rate of flow of such liquid component.

170. Mechanism for ascertaining the characteristics of a solid suspended in a liquid, comprising means for containing the suspension, means for forming the solid thereof into a layer and removing it from the suspension, means for causing the liquid of the suspension to flow through the layer before its removal from the suspension, and automatic means for recording the thickness of such layer immediately after removal.

171. Mechanism for ascertaining the characteristics of a solid suspended in a liquid, comprising means for containing the suspension, means for forming the solid thereof into a layer and removing it from the suspension, means for causing the liquid of the suspension to flow through the layer before its removal from the suspension, and means for automatically recording the resistance of such layer in the course of its formation to the passage of the liquid therethrough.

172. Mechanism for ascertaining the characteristics of a solid suspended in a liquid, comprising means for containing the suspension, means for forming the solid thereof into a layer and removing it from the suspension, means for causing the liquid of the suspension to flow through the layer before its removal from the suspension, and means for recording the rate of the flow of the liquid through such layer in the course of its formation.

173. Mechanism for ascertaining the characteristics of a solid suspended in a liquid, comprising means for containing the suspension, means for forming the solid thereof into a layer and removing it from the suspension, means for causing the liquid of the suspension to flow through the layer before its removal from the suspension, and means for recording the thickness of the formed layer and the rate of the flow of the liquid therethrough in the course of its formation.

174. Mechanism for ascertaining the characteristics of a solid suspended in a liquid, comprising means for containing the suspension, a screen adapted to travel through said suspension, means for causing the solid of the suspension to form a layer on said screen and the liquid of said suspension to flow therethrough, and means for automatically recording the thickness of said formed layer on said screen.

175. Mechanism for ascertaining the characteristics of a solid suspended in a liquid, comprising means for containing the suspension, a screen adapted to travel through said suspension, means for causing the solid of the suspension to form a layer on said screen and the liquid of said suspension to flow therethrough, and means for automatically recording the rate of the flow of liquid through the forming layer.

176. Mechanism for ascertaining the characteristics of a solid suspended in a liquid, comprising means for containing the suspension, a screen adapted to travel through said suspension, means for causing the solid of the suspension to form a layer on said screen and the liquid of said suspension to flow therethrough during the formation thereof, and means for automatically indicating and recording the resistance to the flow of liquid through such forming layer.

177. Mechanism for ascertaining the characteristics of a solid suspended in a liquid, comprising means for containing the suspension, a screen adapted to travel through said suspension, means for causing the solid of the suspension to form a layer on said screen and the liquid of said suspension to flow therethrough during the formation thereof, and means for automatically measuring and recording the thickness of the formed layer and the rate of the flow of the water through the forming layer.

178. Mechanism for ascertaining the characteristics of a solid suspended in a liquid, comprising means for containing the suspension, a screen adapted to travel through said suspension, means for causing the solid of the suspension to form a layer on said screen and the liquid of said suspension to flow therethrough during its formation, and an indicator and a recording device both automatically controlled by the thickness of the formed layer on the screen.

179. In a device of the class described, a container for a liquid suspension of pulp, means for continuously and separately removing pulp and liquid from the container, means for supplying pulp and liquid to the container, and means for controlling the consistency of the suspension, said controlling means comprising means for measuring the rate of pulp removal, means for measuring the outflow of the liquid, and mechanical means directly responsive to both said measuring means for controlling the rate of admission of pulp into the container.

180. In a device of the class described, a container for a liquid suspension of pulp, means for continuously forming a mat of the pulp of the suspension, means for causing the liquid of the suspension to flow through the mat and out of the container, means for admitting liquid to the container automatically controllable to keep the suspension in the container at a substantially constant level, means for admitting pulp into the container, and means for maintaining a substantially constant ratio of solid to liquid in the suspension, said last means comprising mechanism for measuring the thickness of the pulp mat, mechanism for measuring the outflow of liquid, and mechanical means directly responsive to both mechanisms for controlling the admission of pulp to the container.

181. In a device of the class described, a container for a liquid suspension of pulp, means for continuously forming a mat of the pulp of the suspension, means for causing the liquid of the suspension to pass through said mat, mechanism responsive to variations in the thickness of the formed mat, other mechanism responsive to variations in the flow of the liquid through the mat, means for automatically controlling the inflow of liquid in a manner to maintain the suspension at a substantially constant level, and means for controlling the admission of pulp to the container in a manner to maintain a substantially constant ratio of solid matter to liquid in the pulp suspension, said controlling means comprising a reciprocable member having direct operative connection with both said mechanisms.

182. In a device of the class described, a container for a liquid suspension of pulp, means for continuously forming a mat of the pulp of the suspension, means for causing the liquid of the suspension to flow through the mat, mechanism responsive to variations in the thickness of the formed mat, other mechanism responsive to variations in the outflow of liquid, means for regulating the inflow of liquid in a manner to maintain the suspension at a substantially constant level, and means to control the admission of pulp to the container in a manner to maintain a substantially constant ratio of solid matter to liquid in the pulp suspension, said controlling means comprising a reciprocable member operatively connected directly to both said mechanisms and responsive to an increase in the thickness of the pulp mat to move the reciprocable member in one direction, and responsive to an increase in the outflow of liquid to move the reciprocable member in the opposite direction.

In testimony whereof I have affixed my signature.

MILTON O. SCHUR.